(12) United States Patent
Rychlik et al.

(10) Patent No.: US 9,218,289 B2
(45) Date of Patent: Dec. 22, 2015

(54) MULTI-CORE COMPUTE CACHE COHERENCY WITH A RELEASE CONSISTENCY MEMORY ORDERING MODEL

(71) Applicant: QUALCOMM Incorporated, San Diego, CA (US)

(72) Inventors: Bohuslav Rychlik, San Diego, CA (US); Tzung Ren Tzeng, San Jose, CA (US); Andrew Evan Gruber, Arlington, MA (US); Alexei V. Bourd, San Diego, CA (US); Colin Christopher Sharp, San Diego, CA (US); Eric Demers, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 173 days.

(21) Appl. No.: 13/958,399

(22) Filed: Aug. 2, 2013

(65) Prior Publication Data
US 2014/0040552 A1 Feb. 6, 2014

Related U.S. Application Data

(60) Provisional application No. 61/680,201, filed on Aug. 6, 2012, provisional application No. 61/800,441, filed on Mar. 15, 2013.

(51) Int. Cl.
| G06F 12/00 | (2006.01) |
| G06F 12/08 | (2006.01) |
| G06F 13/00 | (2006.01) |
| G06F 13/28 | (2006.01) |

(52) U.S. Cl.
CPC ........ *G06F 12/0815* (2013.01); *G06F 12/0811* (2013.01); *G06F 12/0837* (2013.01); *G06F 12/0891* (2013.01); *G06F 12/0833* (2013.01); *G06F 2212/302* (2013.01)

(58) Field of Classification Search
CPC ............ G06F 12/0833; G06F 12/0815; G06F 12/0891; G06F 12/0811; G06F 12/0837
USPC .......................................... 711/122
See application file for complete search history.

(56) References Cited

U.S. PATENT DOCUMENTS

| 5,533,035 | A | * | 7/1996 | Saxena et al. | ................ | 714/761 |
| 6,490,657 | B1 | * | 12/2002 | Masubuchi et al. | ........... | 711/135 |

(Continued)

FOREIGN PATENT DOCUMENTS

WO    2009050644 A1    4/2009

OTHER PUBLICATIONS

International Search Report and Written Opinion from International Application No. PCT/US2013/053626, dated Nov. 29, 2013, 10 pp.

(Continued)

*Primary Examiner* — Mark Giardino, Jr.
(74) *Attorney, Agent, or Firm* — Shumaker & Sieffert, P.A.

(57) ABSTRACT

A method includes storing, with a first programmable processor, shared variable data to cache lines of a first cache of the first processor. The method further includes executing, with the first programmable processor, a store-with-release operation, executing, with a second programmable processor, a load-with-acquire operation, and loading, with the second programmable processor, the value of the shared variable data from a cache of the second programmable processor.

52 Claims, 9 Drawing Sheets

(56) References Cited

U.S. PATENT DOCUMENTS

| | | | |
|---|---|---|---|
| 6,557,082 B1 | 4/2003 | Josten et al. | |
| 6,571,321 B2* | 5/2003 | Rowlands et al. | 711/141 |
| 7,136,969 B1 | 11/2006 | Niver et al. | |
| 8,131,941 B2 | 3/2012 | Kinter | |
| 9,081,501 B2* | 7/2015 | Asaad et al. | 1/1 |
| 2002/0147889 A1* | 10/2002 | Kruckemyer et al. | 711/144 |
| 2006/0026371 A1* | 2/2006 | Chrysos et al. | 711/158 |
| 2011/0125974 A1 | 5/2011 | Anderson | |
| 2012/0137075 A1 | 5/2012 | Vorbach | |
| 2013/0262775 A1* | 10/2013 | Asaro et al. | 711/135 |

OTHER PUBLICATIONS

Tartalia, et al., "Classifying Software-Based Cache Coherence Solutions," IEEE Software, Institute of Electrical and Electronics Engineers, May 1, 1997, pp. 90-101.

Second Written Opinion from International Application No. PCT/US2013/053626, dated Oct. 27, 2014, 6 pp.

International Preliminary Report on Patentability from corresponding PCT Application Serial No. PCT/US2013/053626 dated Feb. 6, 2015 (25 pages).

* cited by examiner

MULTI-CORE COMPUTE CACHE COHERENCY WITH A RELEASE CONSISTENCY MEMORY ORDERING MODEL

This application claims the benefit of U.S. Provisional Patent Application No. 61/680,201, filed on Aug. 6, 2012, and U.S. Provisional Patent Application No. 61/800,441, filed Mar. 15, 2013, the entire contents of which are incorporated by reference.

TECHNICAL FIELD

This disclosure is directed to techniques involved in heterogeneous computing, and more particularly, to techniques involved with cache coherency in heterogeneous computing.

BACKGROUND

Recently there has been a move toward so-called heterogeneous computing in which multiple processors are interconnected into one system. In some instances, tasks may be shared amongst the processors. Some of the jobs may be better suited to particular a type of processor, such as a central processing unit (CPU), graphics processing unit (GPU), or digital signal processor (DSP). Each processor involved in performing heterogeneous tasks may have one or more caches. Each cache may contain a copy of variable data that is shared among multiple processors. The caches may allow the processors to speed program execution by making the cached data more quickly accessible to one or more execution units of the processor. When one processor accesses shared variable data that is shared among two or more caches of the processors of the system, a mechanism, referred to as a "cache coherency system," ensures that the copies of the shared variable data stored in the processor caches are consistent among all of the processors of the system, and that changes to the shared variable data are made observable to all processors sharing these variables in a timely and consistent fashion.

SUMMARY

In general, the techniques described in this disclosure are directed to techniques for maintaining cache coherency, i.e., data consistency amongst multiple caches and system memory, in multi-core, e.g., heterogeneous, computing systems which include multiple processor cores, possibly of different types. According to one of the techniques of this disclosure, a central processing unit (CPU), a graphics processing unit (GPU), a digital signal processor (DSP), or another type of processing core may execute instructions when acquiring or writing to a variable shared among all of the processors of a multi-core computing system. When a processor core (referred to as a "processor") attempts to access shared variable data, the processor core may execute synchronization operations, such as load-with-acquire and/or store-with-release operations in order to ensure that the any operations applied to shared variable data occur in an ordered and coherent fashion Some or all of the processors in the multi-core system may include a cache. The cache may comprise a local working set of frequently used data. In some cases, the cache may include a local copy of shared variable data that is shared among one or more other processors of the multi-core system. In accordance with the techniques of this disclosure, each of the other processors may likewise include a cache that includes a local copy of the shared variable data.

In a multi-core system with multiple processors, e.g., a first processor and a second processor, the first processor may change a value of some shared variable data. The first processor may then flush the value of the shared variable data. Flushing the shared variable data may cause the first processor to write the updated shared variable data value, e.g., to system memory. To ensure that other processors see the updated value of the shared variable data, responsive to the cache flush, the first or second processor may invalidate a cache entry corresponding to the shared variable data in the cache of the second processor. When the second processor reads the cache line that previously contained a value of the shared variable data, the cache line is marked as invalid. Because the cache line of the second processor is marked invalid, the second processor retrieves the newest value of the shared variable data from system memory, and updates the cache of the second processor corresponding to the shared variable data, rather than reading an outdated value of the shared variable data from the cache of the second processor. In this manner, the techniques of this disclosure ensure that shared variable data is coherent through the use of cache invalidations and flushes.

In one example, a method includes storing, with a first programmable processor, shared variable data to cache lines of a first cache of the first processor, executing, with the first programmable processor, a store-with-release operation, executing, with a second programmable processor, a load-with-acquire operation-, and loading, with the second programmable processor, the value of the shared variable data from a cache of the second programmable processor.

In another example, the disclosure describes a device that includes a first programmable processor having a first cache, a second programmable processor having a second cache, wherein the device is configured to store, with the first programmable processor, shared variable data to cache lines of the first cache of the first processor, execute, with the first programmable processor, a store-with-release operation, execute, with the second programmable processor, a load-with-acquire operation, and load, with the second programmable processor, the value of the shared variable data from the cache of the second programmable processor.

In another example, the disclosure describes a device that includes means for storing, with a first programmable processor, shared variable data to cache lines of a first cache of the first processor, means for executing, with the first programmable processor, a store-with-release operation, means for executing, with a second programmable processor, a load-with-acquire operation, and means for loading, with the second programmable processor, the value of the shared variable data from a cache of the second programmable processor.

In another example, the disclosure describes a non-transitory computer-readable storage medium having stored thereon instructions that upon execution cause a programmable processor to store, with a first programmable processor, shared variable data to cache lines of the first cache of the first processor, execute, with the first programmable processor, a store-with-release operation, execute, with a second programmable processor, a load-with-acquire operation, and load, with the second programmable processor, the value of the shared variable data from a cache of the second programmable processor.

The details of one or more examples are set forth in the accompanying drawings and the description below. Other features, objects, and advantages will be apparent from the description and drawings, and from the claims.

DETAILED DESCRIPTION

Recently there has been a move toward so-called heterogeneous computing in which multiple processors or processor cores ("cores") are interconnected into one system. However, there are many challenges associated with heterogeneous computing systems. Certain cores may be suited to particular tasks. As an example, CPUs may be more suited to executing programs with significant amounts of conditional logic (e.g., branches and jumps). Other processors, such as Graphics Processing Units (GPUs) may be more suited to performing massively parallel operations, such as vector processing, and floating point operations. Still other processors, such as Digital Signal Processors (DSPs) may be suited to specific applications, such as digital signal processing, which may include performing specific mathematical operations. Such operations may include fast Fourier transforms (FFTs), and discrete cosine transforms (DCTs).

Increasingly, the capabilities of I/O processing cores, such as GPUs, have been augmented to include functionality similar to that of more general purpose CPUs. Many GPUs include the ability to execute more general purpose applications that include conditional logic, such as branches and jumps. Additionally, general purpose computing languages, such as OpenCL by the Khronos Group or DirectCompute by Microsoft, provide application programming interfaces (APIs), which may allow a programmer to write a single program in one language such that the program is capable of executing on any processing core that is compatible with such general purpose computing languages.

Despite the advances in programming languages and increases in the processing capabilities of processors such as GPUs and DSPs, heterogeneous multi-core computing still poses a number of challenges. One such challenge is to ensure that data, such as shared variable data, which is shared among multiple cores of a heterogeneous computing system, remains coherent among the processors. The techniques of this disclosure are directed to a cache coherency system that ensures that changes to shared variable are propagated among all of the processors of the system in a timely and ordered fashion.

Figure 1:
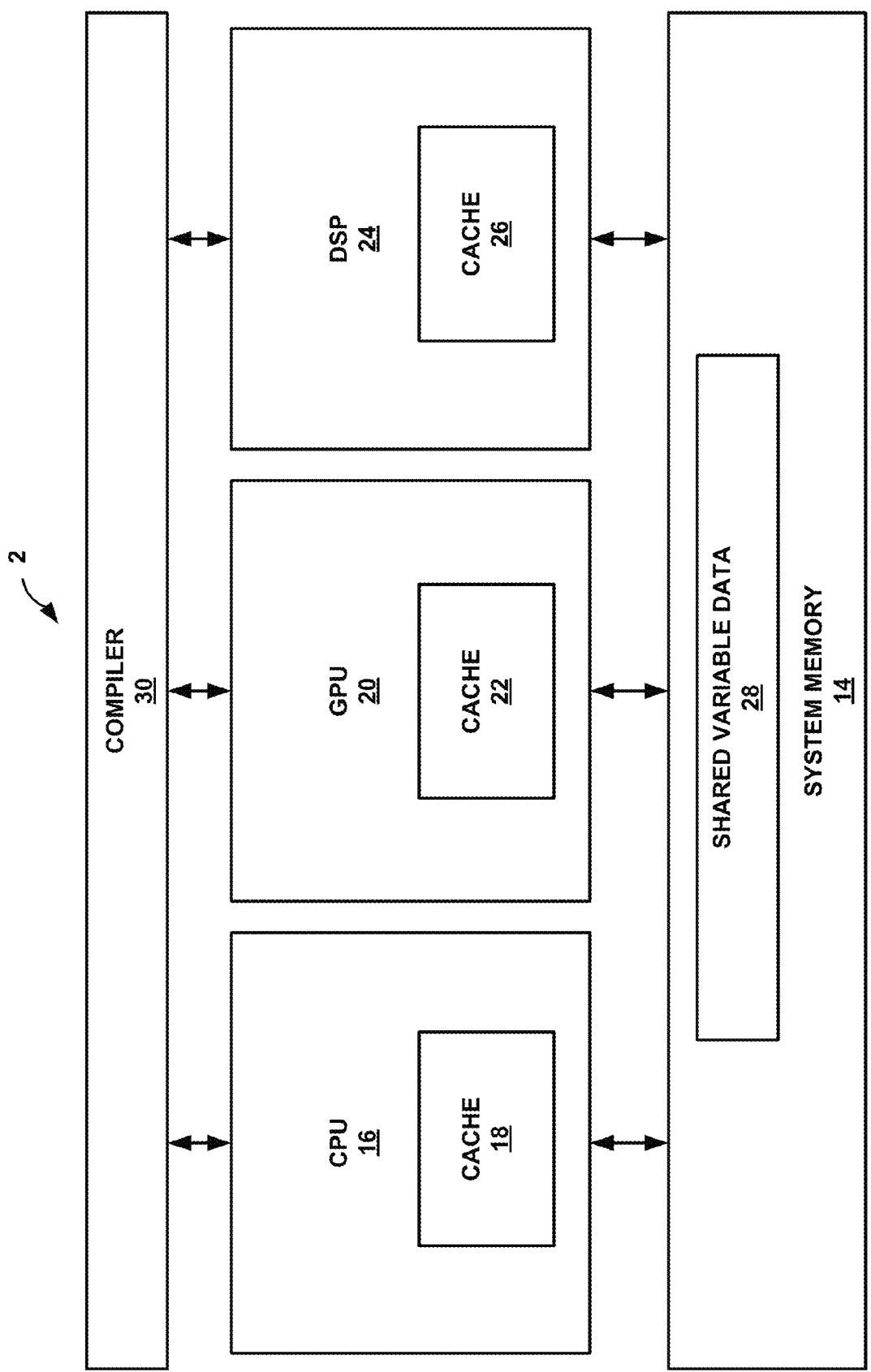
FIG. 1 is a block diagram illustrating an example of a multi-core computing system in accordance with one or more examples described in this disclosure.

FIG. 1 is a block diagram illustrating an example of a multi-core computing system in accordance with one or more examples described in this disclosure. FIG. 1 illustrates a heterogeneous multi-core system 2 that includes a CPU 16, GPU 20, and DSP 24. Although CPU 16, GPU 20, and DSP illustrated as being indivisible units, each of CPU 16, GPU 20, and DSP 24 may represent multiple processors and/or multiple processor cores. As an example, multi-core system 2 may have multiple CPUs, GPUs, DSPs, and/or other types of processors. CPU 16 includes cache 18, GPU 20 includes cache 22, and DSP 24 includes cache 26 (collectively "caches 18, 22, and 26"). Caches 18, 22, and 26 may each store frequently used instructions and/or data for fast retrieval of the instructions data relative to retrieving the instructions and/or data from system memory 14. Although caches 18, 22, and 26 may include instructions and/or data, the techniques of this disclosure are directed toward cache coherency of shared data, and not shared instructions. Accordingly, this disclosure refers only to retrieval and storage of data, such as shared variables, from caches 18, 22, and 26. Each of caches 18, 22, and 26 may include one or more "levels" of cache, such as level 1 ("L1") cache, and level 2 ("L2") cache. An L1 cache may not be able to hold as much data relative to the L2 cache, but a processor may write to and read from the L1 more quickly (i.e., with lower access latency) than the L2 cache.

CPU 16, GPU 20, and DSP 24 are connected to system memory 14, for example, through a system bus. System memory 14 may comprise dynamic random access memory (DRAM), which may include some shared variable data 28. Shared variable data 28 may, for example, comprise shared instruction words, variables, buffers, data structures, jobs, etc. Although CPU 16, GPU 20, and DSP 24 are illustrated as being indivisible units, system memory 14 may comprise one or more physical integrated circuits (also referred to as "chips"). System memory 14 may also include another level of cache, such as a level 3 ("L3") cache that is separate from system memory 14, and which is shared among (i.e., accessible by) each of CPU 16, GPU 20, and DSP 24.

The techniques of this disclosure enable multi-core system 2, which may consist of heterogeneous cores and/or processors (e.g., CPU 16, GPU 20, and DSP 24), to perform cache management in response to synchronizing operations in order to maintain cache coherency across the cores of multi-core system 2. Synchronizing operations may comprise so-called explicit full and partial barriers, fences, as well as combined forms of loads and stores with full and partial barriers. In some examples, the synchronization operations may include store-with-release and load-with-acquire operations.

The techniques of this disclosure enable changes to shared variable data 28, various copies of which may be stored in one or more of cache 18, cache 22, and cache 26, to be propagated to the caches of other processors of multi-core system 2 (i.e., CPU 16, GPU 20, and DSP 24). To enable CPU 16, GPU 20, and DSP 24 to implement a cache coherence mode referred to as an "on-demand cache coherence model." In an on-demand cache-coherence model, a processor that reads or writes shared variable data 28, e.g., GPU 20, may perform a synchronizing operation, such as executing a store-with-release operation and/or a load-with-acquire operation associated with shared variable data 28. The other processors of multi-core system 2, CPU 16, and DSP 24, may also execute store-with-release operation and/or a load-with-acquire operations when associated with reading or writing shared variable data 28.

The store-with-release and load-with-acquire operations are atomic operations (also referred to as "synchronization operations") that may be used to define a memory ordering model. Atomic operations are operations that appear to the rest of a computing system (e.g., cores, processors, memory, etc.) as though they occur instantaneously. When executing load-with-acquire and store-with-release synchronization operations, a processor combines loads and stores with partial barriers to express acquire/release memory model semantics. The C++11 standard is one example of a programming language that defines one implementation of an acquire/release memory model.

The semantics and constraints associated with load-with-acquire and store-with-release operations may be used to ensure that a read from a shared variable, such as shared variable data 28, in a first thread occurs after a write completes to the same shared variable in a second thread, i.e. to force a dependency or ordering between a read and a write of the shared variable. In particular, the acquire/release mode enforces a read/write dependency such that a read to a shared variable in a first thread using a load-with-acquire operation, occurs after executing store-with-release operation on the same shared variable in a second thread.

The on-demand cache coherency techniques of this disclosure describe cache coherency techniques that may be utilized, e.g. in heterogeneous multi-core system 2, to allow multiple processors to execute synchronization operations, e.g., load-with-acquire and store-with-release operations to implement an acquire/release memory ordering model. The on-demand coherency model of this disclosure functions such that whenever a first processor core, e.g., GPU 20, reads shared variable data 28 and performs a synchronizing operation, GPU 20 or another processor may invalidate at least the part of a cache (referred to as a "cache line") of a second core, e.g., one or more lines of cache 18 of CPU 16, containing a value of shared variable data 28. GPU 20 may automatically invoke the invalidation of the cache line of cache 18 as part of executing the synchronizing operation.

Alternatively, when a program code includes load-with-acquire and store-with release operations, a compiler, such as compiler 30, may automatically invoke the invalidation of cache 22. Compiler 30 may comprise a driver and/or a compiler, and may generate, compile, and/or modify code for one or more of CPU 16, GPU 20, and DSP 24. In some examples, compiler 30 may be an application or process of an operating system that executes one or more of CPU 16, GPU 20, and DSP 24. Compiler 30 may automatically invoke the cache invalidation by inserting a low-level cache invalidation instruction into the program code at compile time or at run-time at locations in the code that include synchronization operations. The second core then executes the modified code that includes the cache invalidation instructions. Once the first core has invalidated the cache lines of cache 18 containing shared variable data 28, CPU 16 then obtains a new copy of the shared data from the system (e.g., from system memory 14, a high level cache, or another processor's cache), thereby ensuring that the value of shared variable data 28 that CPU 16 reads are not "stale" or outdated.

When a processor, such as CPU 16, executes a load-with-acquire operation, CPU 16 may invalidate any cache lines, e.g., of cache 18, which contain shared variable data 28. When CPU 16 attempts to read from the invalid cache lines, a cache miss occurs, and CPU 16 then reads new values of the invalidated cache lines into cache 18 and merges any dirty values for shared variable data 28. In this manner, a load-with-acquire operation ensures that any values loaded as part of executing a load-with-acquire operation are the most up-to-date values currently in the memory hierarchy, e.g. system memory 14, cache 18, cache 22, and cache 26.

As described above, a store-with-acquire operation may be paired with a load-with-acquire operation to ensure that a first processor completes executing a store of a shared variable value before a second processor executes the load of the shared variable. In order to ensure that the load executes after the store, CPU 16 or another processor may append a synchronization bit to an instruction subsequent to the store-with-release operation, such as the load-with acquire instruction that GPU 20 executes. Appending the synchronization bit to the subsequent instruction effectively causes CPU 16 to execute a barrier, in which the subsequent instruction does not issue until all previous stores that CPU 16 has begun executing have completed.

A processor need not implement on-demand cache coherence to interoperate with a processor that implements on-demand cache coherence. Rather, any processor that supports I/O coherence, i.e. some form of cache coherence, may interact with processors that implement on-demand cache coherence, which may be implemented using load-with-acquire and store-with release instructions. As an example, Some processors of system 2 may support on-demand cache coherence, while others may support more traditional cache coherency protocols, such as the MESI (Modified, Exclusive, Shared, Invalid), and MOESI (Modified, Owned, Exclusive, Shared, Invalid) protocols. In some examples, processors without any caches may interoperate with on-demand cache coherent processors.

As an example, a processor, such as CPU 16, may not implement on-demand cache coherency in accordance with the techniques of this disclosure, but may implement I/O coherence or cache coherence. CPU 16 may be uncached, i.e. may not include a cache, or may implement another cache coherence protocol, such as MESI, or MOESI. GPU 20 and/or DSP 24 may implement on-demand cache coherence, and may interoperate with CPU 16 so long as CPU 16 supports some form of I/O coherence.

In accordance with the techniques of this disclosure, a first processor and a second processor may perform various cache management techniques, referred to as on-demand cache coherency, in order to implement an acquire/release memory ordering model. As an example in accordance with the techniques of this disclosure, a first programmable processor, e.g. CPU 16, may store shared variable data to cache lines of cache 18. CPU 16 may then execute a store-with-release operation. A second processor, e.g. GPU 20, may execute a load-with-acquire operation. The second processor may then load the value of the shared variable data from a cache of GPU 20, e.g. cache 22.

In various other examples, the store-with-release operation may not cause a cache flush. Rather, a compiler or driver may insert a cache flush instruction the execution of a program, which causes CPU 16 to flush the cache line corresponding to the updated value of shared variable data 28. CPU 16 may also flush cache 18 responsive to at least one of cache pressure, a timeout, and an explicit software cache maintenance. In another example, CPU 16 may execute a store-with release operation responsive to at least one of receiving an interrupt, a register read, a register write, and a programmable delay.

In some examples, the store-with-release operation may further cause CPU 16 or another processor to invalidate one or more cache lines of another processor, e.g., cache 22 or cache 26, which contain outdated values of shared variable data 28 by snooping into the cache lines of the other processor and updating the cache lines that contain shared variable data 28. A compiler or driver may also insert a cache invalidation instruction that causes CPU 16 or GPU 20 to invalidate the lines of cache 22 corresponding to outdated values of shared variable data 28.

In some examples, some processors in multi-core system 2 may not have caches that are visible to other processors. Nevertheless, these processors may include the capability to read the latest value of a shared variable from the processors that do have visible caches. Also, these processors that do not have visible caches may provide a new value to a shared variable through a write operation. In accordance with the techniques of this disclosure, the writes of a processor with a non-visible cache may be scheduled behind all the writes in the system to shared variable data 28, which have already been observed. The mechanism that enables processors that have no visible caches to read and write in the above mentioned manner is commonly called IO cache coherency.

In an alternative example, the first processor could also choose to temporarily buffer or cache the value from the write operation associated with the store-with-release and write the value to system memory (e.g., a higher level of cache, the cache of another processor, or system memory) at a later time while still maintaining correct semantics.

In accordance with the techniques of this disclosure, CPU 16 may be configured to store shared variable data 28 to cache lines of cache 18. CPU 16 may be further configured to execute a store-with-release operation. A second programmable processor, such as GPU 20 may be configured to execute a load-with-acquire operation. GPU 20 may further load the value of shared variable data 28 from cache 22 of GPU 20.

Responsive to a synchronization operation, e.g., a store-with-release operation, CPU 16 may flush the cache lines of the cache 18 associated with shared variable data 28. A second programmable processor, e.g., GPU 20 having a second cache 22, may then execute a load-with-acquire operation, which ensures that any load instructions occur after the load-with-acquire operation finishes executing. The load-with-acquire operation may also invalidate cache lines of cache 22 corresponding to shared variable data 28 and cause a cache fill from another cache or system memory 14. Any loads subsequent to the execution of the load-with-acquire operation will read the up-to-date value of shared variable data 28 from cache 22 of GPU 20.

Figure 2:
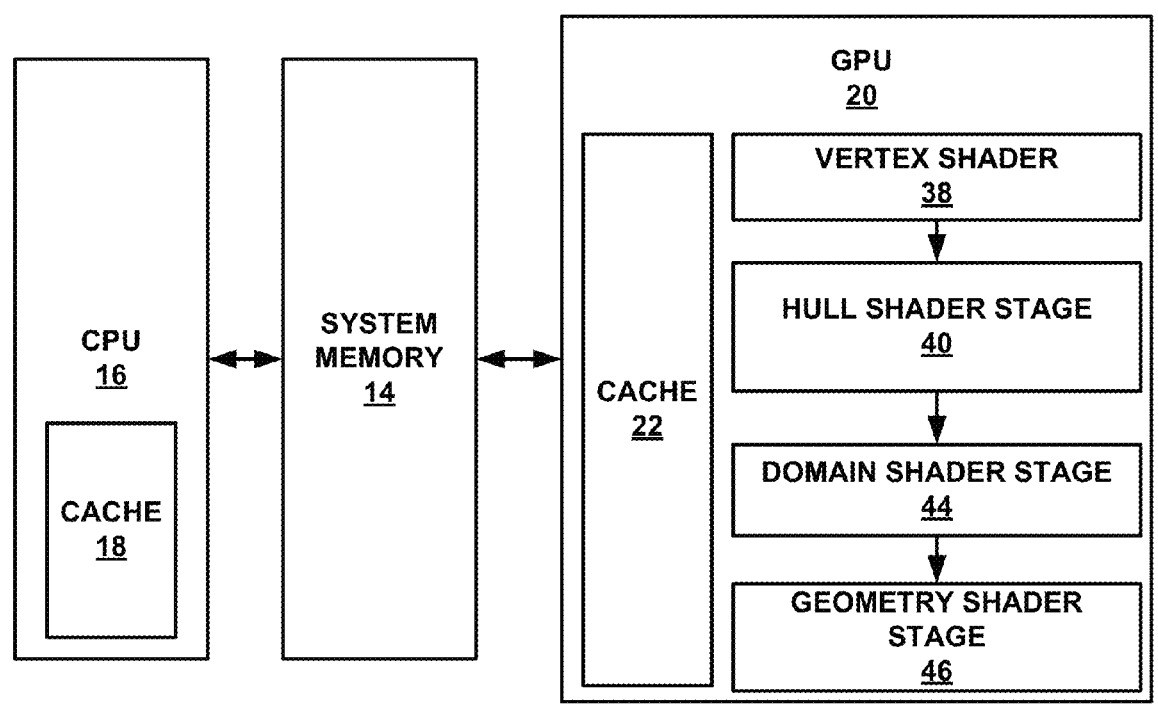
FIG. 2 is a block diagram illustrating another example of a graphics processing unit (GPU) that may implement a graphics processing pipeline capable of executing instructions that allow the GPU to support on-demand cache coherence.

FIG. 2 is a block diagram illustrating another example of a graphics processing unit (GPU) that may implement a graphics processing pipeline capable of executing instructions that allow the GPU to support on-demand cache coherence in accordance with one or more examples described in this disclosure. FIG. 2 illustrates a multi-core system 2 that includes GPU 12, system memory 14, and CPU 16, which further includes cache 18. Examples of devices that may include multi-core system 2 include, but are not limited to, mobile wireless telephones, video gaming consoles that include video displays, mobile video conferencing units, laptop computers, desktop computers, tablet computers, television set-top boxes, and the like.

CPU 16 may execute various types of applications. Examples of the applications include web browsers, e-mail applications, spreadsheets, video games, or other applications that generate viewable objects for display, as well as general purpose computing jobs. Instructions for execution of the one or more applications may be stored within system memory 14. CPU 16 may transmit processing jobs, as well as graphics data of the generated viewable objects to GPU 20 for further processing.

For example, GPU 20 may be specialized hardware that allows for massively parallel processing, which functions well for processing graphics data, as well as for parallelizable tasks, such as various simulations and mathematically intense jobs. In this way, CPU 16 may offload processing that is better handled by GPU 20. CPU 16 may communicate with GPU 20 in accordance with a particular API. Examples of such APIs include the DirectX® API by Microsoft® and the OpenGL® by the Khronos group; however, aspects of this disclosure are not limited to the DirectX and the OpenGL APIs, and may be extended to other types of APIs that have been developed, are currently being developed, or are to be developed in the future.

In addition to defining the manner in which GPU 20 is to receive graphics data from CPU 16, the APIs may define a particular graphics processing pipeline that GPU 20 is to implement. Certain aspects of the pipeline setup may be handled by a GPU driver and shader code compiler, such as compiler 30, executing on CPU 16. The GPU driver may be separate from the application executing on CPU 16. The driver may handle the interaction between an operating system, such as Windows® or Linux, which is typically executed on CPU 16, and GPU 20. The shader code compiler may compile code written in a language, such as OpenCL or DirectCompute, into assembly instructions that GPU 20 may interpret and execute. GPU 20, in FIG. 1, illustrates the graphics processing pipeline defined by the Direct3D 11 API. Although the pipeline of GPU 20 is described with respect to the DirectX pipeline, the GPU 20 may also be implemented according to the OpenGL 4.x pipeline or another graphics pipeline.

Examples of CPU 16 and GPU 20 include, but are not limited to, a digital signal processor (DSP), general purpose microprocessor, application specific integrated circuit (ASIC), field programmable logic array (FPGA), or other equivalent integrated or discrete logic circuitry. In some examples, GPU 20 may be specialized hardware that includes integrated and/or discrete logic circuitry that provides GPU 20 with massive parallel processing capabilities suitable for graphics processing. In some instances, GPU 20 may also include general purpose processing, and may be referred to as a general purpose GPU (GPGPU). The techniques described in this disclosure may also be applicable to examples where GPU 20 is a GPGPU.

System memory 14 may comprise one or more computer-readable storage media. Examples of system memory 14 include, but are not limited to, a random access memory (RAM), a read only memory (ROM), an electrically erasable programmable read-only memory (EEPROM), flash memory, or any other medium that can be used to carry or store desired program code in the form of instructions and/or data structures and that can be accessed by a computer or a processor. As described above, system memory 14 may also include one or more levels of cache.

In some aspects, system memory 14 may include instructions that cause CPU 16 and/or GPU 20 to perform the functions ascribed to CPU 16 and GPU 20 in this disclosure, such as instructions for performing synchronization operations associated with shared variable data 28. In some examples, the instructions may include load-with-acquire, and storewith-release operations, which may cause a cache, e.g., cache 18 or cache 22 to perform cache invalidation and/or cache flushing. Accordingly, system memory 14 may be a computer-readable storage medium comprising instructions that cause one or more processors, e.g., CPU 16 and GPU 20, to perform various functions.

System memory 14 may, in some examples, be considered as a non-transitory storage medium. The term "non-transitory" may indicate that the storage medium is not embodied in a carrier wave or a propagated signal. However, the term "non-transitory" should not be interpreted to mean that system memory 14 is non-movable. As one example, system memory 14 may be removed from the device of multi-core system 2, and moved to another device. As another example, a system memory, substantially similar to system memory 14, may be inserted into the device of multi-core system 2. In certain examples, a non-transitory storage medium may store data that can, over time, change (e.g., in RAM).

The execution of the applications on CPU 16 causes CPU 16 to generate jobs, processes or threads for execution on GPU 20. The job may execute on one or more cores or execution units of GPU 20. In addition, GPU 20 may also render a plurality of primitives that together form the viewable content. Examples of the primitives include points, lines, triangles, squares, or any other type of polygon. CPU 16 may define these primitives by their respective vertices. For example, CPU 16 may define coordinates and color values for the vertices. The coordinate values may be three-dimensional (3D) coordinates or 2D coordinates.

GPU 20 may utilize the functional units, e.g., floating point units, shaders, caches, etc., of GPU 20 in order to execute a GPGPU program or "kernel," rather than to render graphical output. The graphics pipeline shown in FIG. 2 is a 3D graphics processing pipeline. However, the techniques of this disclosure are applicable for use on any type of pipeline, including a GPGPU pipeline, or application executing on GPU 20. The graphics processing pipeline includes performing functions as defined by software or firmware executing on GPU 20 and performing functions by fixed-function units that are hardwired to perform specific functions. The software or firmware executing on the GPU 20 may be referred to as shaders, and the shaders may execute on one or more shader cores of GPU 20. Shaders provide users with functional flexibility because a user can design the shaders to perform desired tasks in any conceivable manner. The fixed-function units, however, are hardwired for the manner in which the fixed-function units perform tasks. Accordingly, the fixed-function units may not provide much functional flexibility.

The shaders, which may include a vertex shader 38, domain shader 44, and geometry shader stage 46, as well as other shader units not pictured in FIG. 2, may be programmable units, whereas other stages or units of GPU 20 (not pictured in FIG. 2) may not be programmable. To support on-demand cache coherence in accordance with the techniques of this disclosure, the shaders of GPU 20 may be configured to support additional operations, which may include load-with-acquire and store-with-release operations. In some examples, the load-with-acquire operations and the store-with-release operations may cause GPU 20 to perform cache invalidations and/or flushes. GPU 20 may also support separate, explicit cache management instructions, which may control the behavior of cache 22. The cache management instructions may include a cache flush instruction and a cache invalidation instruction. The cache flush instruction and/or the store-with-release operation may cause GPU 20 to write out values, e.g., of shared variable data 28, stored in cache 22 to system memory 14, to a higher level cache, or to cache 18 of CPU 16. The cache invalidation instruction and/or load-with-acquire operation may cause GPU 20 to read data values from system memory 14 and store the values in cache 22.

In some examples, the addition of cache management instructions, and load-with-acquire and store-with-release operations, may allow GPU 20 to maintain cache coherency without requiring dedicated cache coherency hardware, which may be expensive from a power and/or area standpoint. A driver, compiler (e.g., compiler 30), or another application may modify the code of a shader program (referred to as a "kernel"). The compiler or driver may automatically insert code at points where a load-with-acquire operation or store-with-release operation occurs to maintain cache coherency with the other processors of multi-core system 2 in accordance with the techniques of this disclosure. The insertion of code by the compiler or driver is shown in greater detail in FIGS. 3A and 3B.

The kernel compiler may insert synchronizing operations, e.g., load-with-acquire or store-with-release operations if the compiler determines that the kernel will access shared variable data 28. The load-with-acquire operation may cause GPU 20 to invalidate shared cache lines (e.g., cache lines associated with shared variable data 28), perform a cache fill, and ensures that no reads can be reordered to execute before the completion of the completion of the load-with-acquire operation. The store-with-release operation may cause GPU 20 to flush any cache lines containing shared variable data 28, and ensures that no writes in the current thread can be reordered to execute after the store-with-release operation. When a store-with-release operation executed by one processor is followed by a load-with-acquire operation, changes to shared variable data 28 occur in an ordered and consistent fashion. The load-with-acquire and store-with-release operations may be part of the kernel/shader programming language in some examples. However in some examples, the need for performing a synchronization operation, e.g., a load-with-acquire or store-with-release operation, may not be known at compile time, because the need for these synchronization operations instructions may depend on whether the kernel will be run with any shared data or variables (also referred to as "shared surfaces").

To ensure cache coherency when GPU 20 is reading a shared variable, the compiler or driver may analyze the shader code and may insert instructions for synchronization operations, e.g., load-with-acquire and store-with-release operations into the shader code when reading from and/or writing to shared variable data 28. The synchronization operations may include cache invalidation instructions that cause GPU 20 to read the value of shared variable data 28 from system memory 14 and store the value of shared variable data 28 in cache 22 before reading the value of shared variable data 28. To ensure cache coherency when GPU 20 writes a value back to cache 22, the compiler or driver analyzes the shader code and inserts a synchronization operation, e.g., load-with-acquire or store-with-release operations that ensure that changes to shared variable data 28 are propagated in an ordered manner.

In some examples, a synchronization operation such as a store-with-release operation, may cause GPU 20 to invalidate one or more cache lines of cache 18 corresponding to shared variable data 28 and to fetch a new value of shared variable data 28 and store the new value of shared variable data 28 in cache 22. In some examples, GPU 20 may "snoop" or read the cache of another processor, e.g., cache 18 of CPU 16 to obtain the most up-to-date value of shared variable data 28. In other examples, GPU 20 may read the value of shared variable data 28 from system memory 14 or a higher level cache.

The compiler or driver may insert synchronizing operations, e.g., store-with-release and load-with-acquire operations into the kernel in a number of different ways. In one example, the compiler may insert store-with-release and load-with-acquire operations around load and store instructions to shared variable data 28. In another example, the compiler may insert NOP (No Operation) instructions into the kernel around reads and writes (loads and stores) to shared variable data 28. At bind time of the kernel, the driver may determine whether the kernel is paired with shared variable data 28 (e.g., shared surfaces). Based on whether the kernel is paired with shared variable data 28, the driver may modify the kernel binary and replace the NOP instructions with store-with-release and load-with-acquire operations in accordance with the techniques of this disclosure. And in yet another example, GPU 20 may compile and store-with-release and load-with-acquire operations into the kernel conditionally at execution time based on a constant value stored in a register of GPU 20 that the driver may set before launching the kernel.

To flush or invalidate shared variables of cache 22, the driver may create a list of shared variables in the kernel code at bind time, and before launching the kernel. While executing the kernel, GPU 20 may execute a routine that "walks" or traverses the list of shared variables and flushes or invalidates the area of cache 22 associated with each shared variable in the list wherever a synchronizing operation is executed on a particular variable. If the list of shared variables is empty, then GPU 20 may not execute store-with-release and load-with-acquire operations.

As indicated above, the graphics processing pipeline illustrated in FIG. 2 is a graphic processing pipeline substantially as defined by Direct3D 11. In this example, GPU 20 may include one or more vertex shader stage 38, hull shader stage 40, domain shader stage 44, and geometry shader stage 46. GPU 20 may include more stages than those illustrated, and in some examples, GPU 20 may not necessarily include all of the illustrated stages. Also, the specific ordering of the stages is provided for purposes of illustration and should not be considered limiting.

Vertex shader stage 38 may process vertices and may perform per-vertex operations such as transformations, skinning, morphing, and per-vertex lighting. Vertex shader stage 38 may be a shader. Hull shader stage 40 receives control points of a patch, as processed by vertex shader stage 38, process the control points, and outputs control points for a processed patch. In other words, hull shader stage 40 receives an input patch, as processed by vertex shader stage 38, processes the input patch, and outputs an output patch. Hull shader stage 40 may perform various functions for processing the input patch. For example, hull shader stage 40 may modify the coordinates of the control points of the patch to change the locations of the control points, or may even add or delete control points of the patch.

In addition, hull shader stage 40 may determine values that indicate how many primitives are to be added to the patch generated by vertex shader stage 38 (i.e., the output patch). Hull shader stage 40 may utilize various criteria to determine how many primitives are to be added to the patch. Described below are two example criteria that hull shader stage 40 may utilize to determine how many primitives are to be added to the patch. However, aspects of this disclosure are not so limited, and hull shader stage 40 may utilize any criteria to determine how many primitives should be added to the patch. Based on a determination of how many primitives should be added, hull shader stage 40 may output a domain type and values that indicate how many primitives are to be added to the patch.

Domain shader stage 44 may receive a set of vertex coordinates from a tessellation stage (not pictured). Domain shader stage 44 may execute for each vertex coordinate outputted by a tessellation stage (not pictured). With the coordinates of the control points of the patch from hull shader stage 40, domain shader stage 44 may determine the location of the vertex, as outputted by the tessellation stage, on the patch. Geometry shader stage 46 receives the vertices of the primitives added to the patch by domain shader stage 44 and may further generate additional vertices for the primitives to add even more resolution.

Multi-core system 2 may implement various techniques to implement cache coherency between CPU 16, and GPU 20. In accordance with the techniques of this disclosure, GPU 20 may be configured to store shared variable data 28 to cache lines of the cache 22 of GPU 20. GPU 20 may be configured to execute a store-with-release operation. CPU 16 may then execute a load-with-acquire operation, and load the value of shared variable data 28 from cache 18 of CPU 16.

Figure 3A:
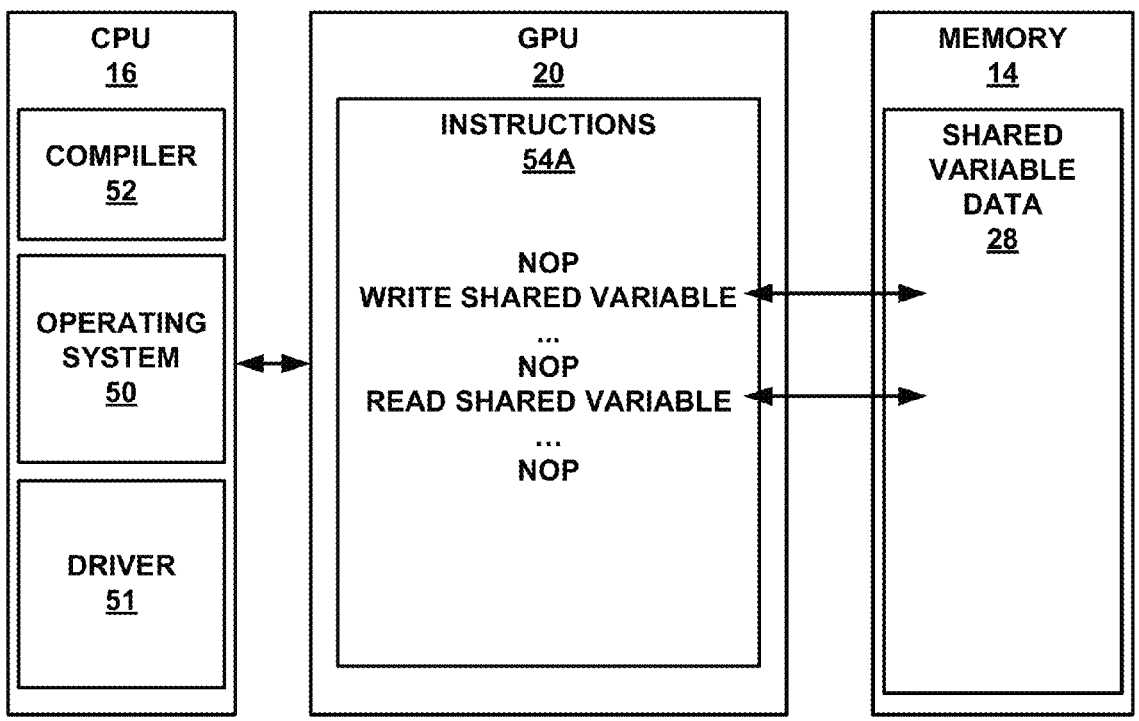
FIG. 3A is a conceptual diagram illustrating a GPU configured to perform synchronizing operations in a GPU kernel, which may include cache invalidate and flush instructions.

FIG. 3A is a conceptual diagram illustrating a GPU configured to perform synchronizing operations in a GPU kernel, which may include cache invalidate and flush instructions. FIG. 3A illustrates CPU 16, GPU 20, and system memory 14. CPU 16 executes an operating system 50, a GPU driver 51, and a GPU compiler 52. Operating system 50 may perform scheduling of tasks, such as threads, and may also manage the execution of GPU driver 51 and GPU compiler 52. GPU driver 51 may manage the interaction between CPU 16 and GPU 20, and in some examples, may modify instructions 54A of GPU 20 to include cache management instructions in accordance with the techniques of this disclosure. GPU compiler 52 may compile code for a GPGPU program, and in some examples, may modify the code at compile time to include cache management instructions in accordance with the techniques of this disclosure.

In FIG. 3A, GPU 20 is about to execute instructions 54A. GPU compiler 52 may have previously generated instructions 54A, which driver 51 may have loaded into a memory of GPU 20. Instructions 54A include a series of reads and writes to shared variable data 28. In these examples, shared variable data 28 may be shared between GPU 20 and another processor, such as CPU 16, and may be stored in both cache 22 of GPU 20 and in cache 18 of CPU 16.

CPU 16 may execute a write that changes the value of shared variable data 28, which GPU 20 reads subsequently, as illustrated in instructions 54A. Compiler 52 may insert a series of no operation (NOP) instructions around the write and read instructions, which, at run-time may be replaced, e.g., by operating system 50 or driver 51, with synchronization operations to ensure that the write by CPU 16 to shared variable data 28 is propagated in a coherent fashion to GPU 20, when GPU 20 executes the read instruction of instructions 54A.

A processor that executes hardware instruction or software routine, such as a load-with-acquire routine or instruction or a store-with-release routine may not be interrupted. One such way that the routine may not be interrupted is by using a programming construct, referred to as a critical section, which only allows one processor to execute the load-with-acquire routine at a particular time. In another example, a processor may ensure that the routine is not interrupted by temporarily disabling interrupts in multi-core system 2.

After GPU compiler 52 has generated instructions 54A, GPU compiler 52 or GPU driver 51 may insert or modify instructions 54A to include synchronizing operations, such as load-with-acquire operations, which may perform cache flushes and/or invalidations in order to maintain cache coherency in accordance with the techniques of this disclosure. The result of modifying instructions 54A to synchronization operations, which may include cache management instructions, is illustrated in FIG. 3B.

Figure 3B:
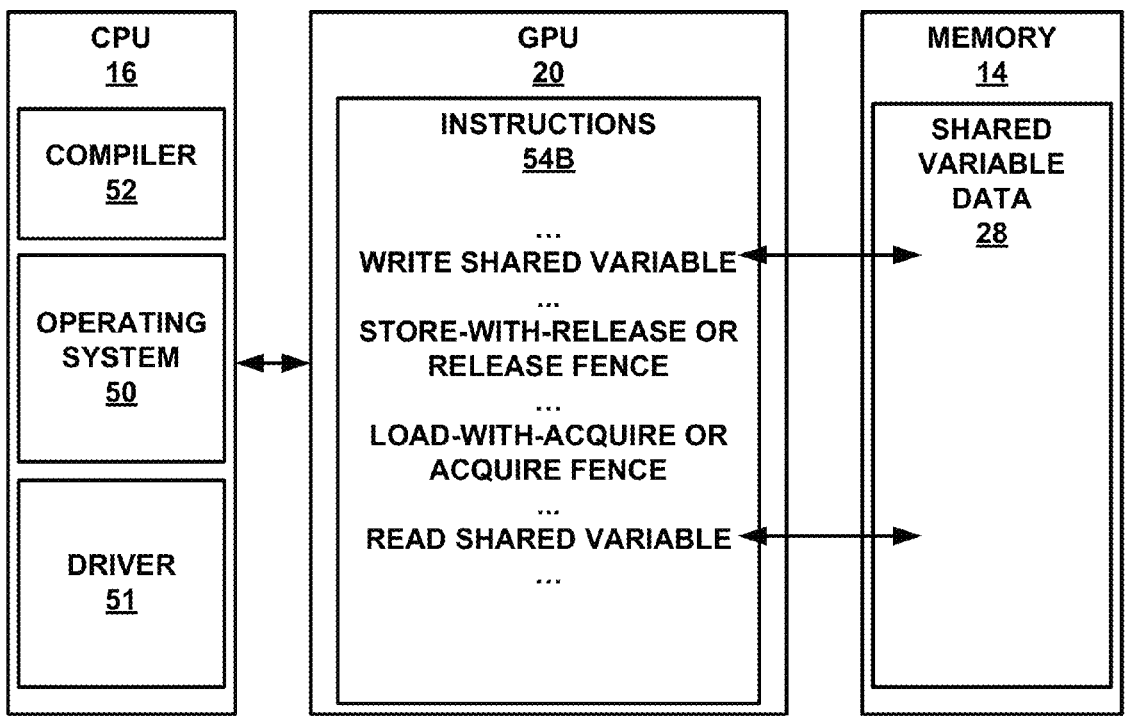
FIG. 3B is a conceptual diagram illustrating a compiler/driver inserting instructions for synchronizing operations into a GPU kernel.

FIG. 3B is a conceptual diagram illustrating a compiler/driver inserting instructions for synchronizing operations into a GPU kernel. After GPU compiler 52 has generated instructions 54A (FIG. 3A), GPU compiler 52 or GPU driver 51 may modify the instructions to include synchronization operations, such as cache management instructions. GPU compiler 52 or GPU driver 51 may modify instructions 54A based on whether the instructions access a shared variable. In this example, instructions 54A include a write followed by a read of shared variable data, e.g., shared variable data 28. GPU compiler 52 or GPU driver 51 may modify instructions 54A by inserting a load-with-acquire operation after the write instruction and by inserting store-with-release operations after the store-with-release operation, but before the read of shared variable data 28 by GPU 20. The store-with-release operation may cause a first processor, such as GPU 20 to flush the cache lines associated with shared variable data 28 and ensures that the write does not occur after the store-with-release operation. The load-with-acquire operation may cause GPU 20 to invalidate lines of cache 18 of CPU 16, which hold any copies of shared variable data 28 and to perform a cache fill, e.g., by snooping or reading a value of shared variable data 28 from system memory 14. The load-with-acquire operation further ensures that the read occurs after the load-with-acquire operation has finished executing, thereby ensuring that the value of shared variable data 28 read by GPU 20 is the most up-to-date value. The effect of cache flushes and invalidation instructions are described below with respect to FIGS. 4A and 4B.

GPU compiler 52 or GPU driver 51 may modify instructions 54A based on whether shared variables are known at compile time or at bind time. In the case that shared variables are known at compile time, GPU compiler 52 may modify instructions 54A at compile time. If the shared variables are known at bind time, GPU driver 51 may modify instructions 54A at bind time. In either case, the modified instructions comprise instructions 54B. Also, in some examples, GPU compiler 52 or GPU driver 51 may not insert instructions into the instructions of a kernel, but rather may replace NOP instructions originally inserted by the compiler as placeholders with the synchronization operations as described above. Once GPU driver 51 or GPU compiler 52 has modified instructions 54A, GPU 20 may execute instructions 54B, which have been modified in such a way as to ensure cache coherency between GPU 20 and the other processors of multi-core system 2.

Figure 4A:
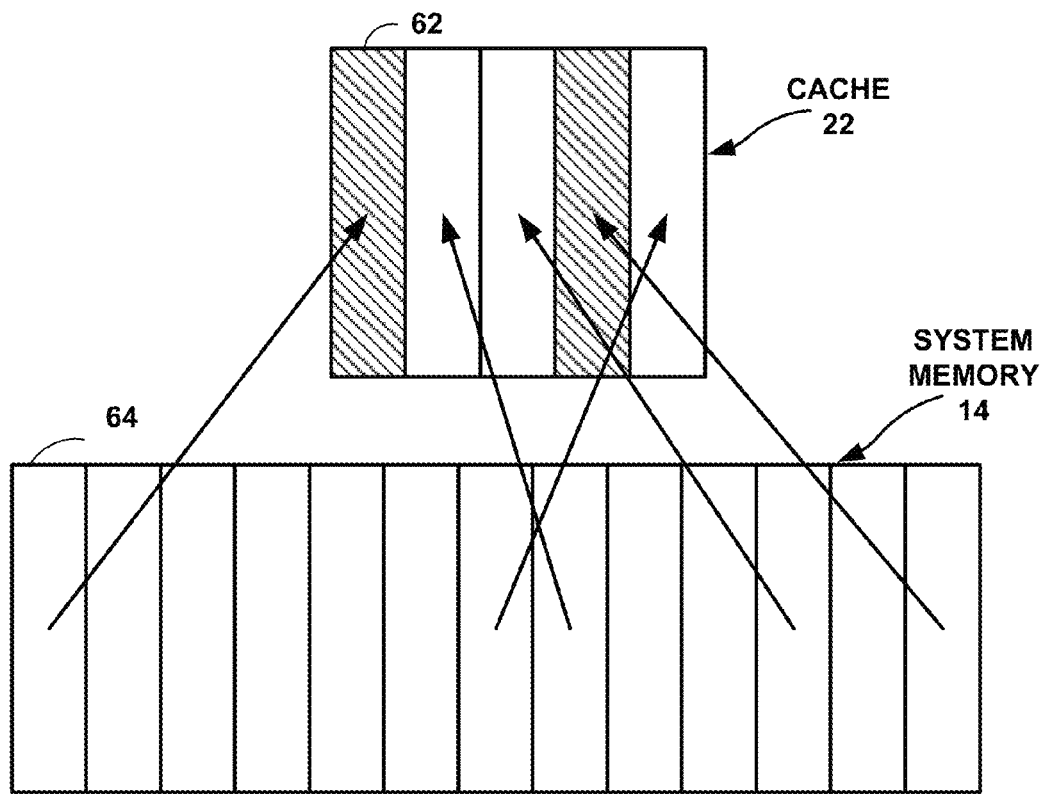
FIG. 4A is a conceptual diagram illustrating a cache containing a stale shared variable.

FIG. 4A is a conceptual diagram illustrating a cache containing a stale shared variable. FIG. 4A illustrates system memory 14 of FIG. 1, and a cache 22 of GPU 20 (FIG. 1). Although illustrated with respect to GPU 20 and GPU cache 22, any cache of any core or processor may perform the techniques illustrated in FIG. 4A and FIG. 4B.

Cache 22 includes five entries, each of which are represented as vertical rectangles. The number of entries in cache 22 has been greatly reduced for the purposes of example. Cache 22 includes two entries that have stale data (indicated by cache entries that have diagonal hashing). Stale data are shared variable values that may have been altered by another processor in multi-core system 2. The arrows in FIGS. 4A-4B indicate an association between a location of system memory 14 and an entry in cache 22 such that if GPU 20 reads shared data from a location of system memory 14 indicated by the tail of any of the arrows, the value is stored at the location of cache 22 indicated by the head of the arrow.

Before reading from line of cache 22 that includes stale data, GPU 20 may execute a load-with-acquire operation. The load-with-acquire operation causes CPU 16 to invalidate one or more lines of cache 18, causes a cache fill of cache 18, and ensures that no reads are reordered to execute before the execution of the load-with-acquire operation.

As noted above, because cache line 62 is marked as invalid due to the load-with-acquire operation, GPU 20 fetches a new copy of shared variable data 28 from address 64 of system memory 14. In some examples, GPU 20 may not need to fetch a new copy from system memory, but rather from a higher level cache e.g., a level 2 or level 3 cache that is shared between CPU 16 and GPU 20. In another example, CPU 16 may modify or "snoop" and update the value of shared variable data 28 stored in cache line 62.

Figure 4B:
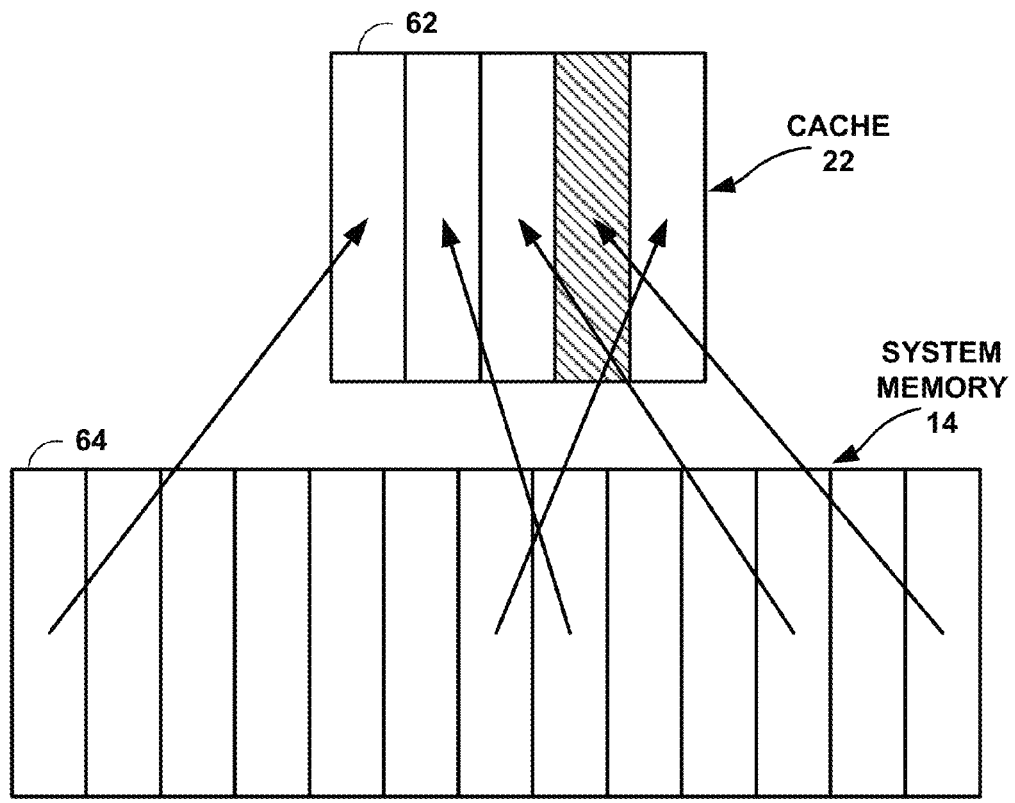
FIG. 4B is a conceptual diagram illustrating updating a cache from main memory due to reading from a cache line marked as invalid.

FIG. 4B is a conceptual diagram illustrating updating a cache from main memory due to reading from a cache line marked as invalid, e.g., as a result of executing a load-with-acquire operation. FIG. 4B illustrates the results of GPU 20 reading from a cache line 62 that is marked as invalid, and fetching the up-to-date copy of shared variable data 28 stored at location 62 of system memory 14. Although illustrated as reading from system memory 14, GPU 20 may also read a new value of shared variable data 28 from another cache, such as cache 18 of CPU 16. After CPU 16 marks cache line 62 as invalid, as described above with respect to FIG. 4A, GPU 20 may read the value of shared variable data 28 from system memory location 64, and stores the shared variable data 28 from system memory location 64 in cache location 62. Although illustrated as invalidating only a single cache entry, the cache invalidation instruction may also invalidate all or multiple entries of cache 22, such as all cache entries which are marked as shared. Shared cache entries are discussed in further detail below.

Figure 5A:
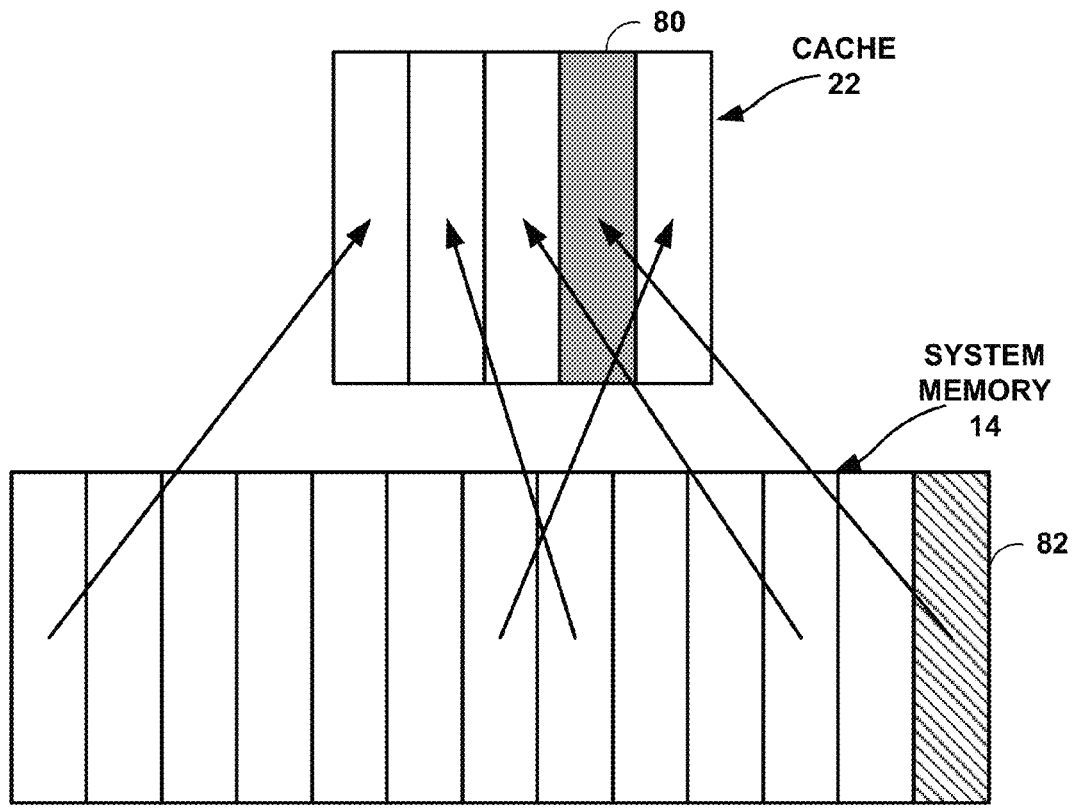
FIG. 5A is a conceptual diagram illustrating a main memory containing a stale shared variable.

FIG. 5A is a conceptual diagram illustrating a system memory containing a stale shared variable value. In FIG. 5A, the value of shared variable data 28, which is stored in line 80 of cache 22 is up-to-date, but has not been written back to location 82 of system memory 14. This situation may occur, for example, if GPU 20 calculates a new value for shared variable data 28 and writes the value of shared variable data 28 to cache 22, but not to system memory 14.

To ensure that location 82 of system memory 14 has the current value of the shared variable, GPU 20 performs a process similar to the process described with respect to FIG. 4A. Similar to the technique described with respect to FIG. 4A, GPU 20 performs a synchronization operation, such as executing a store-with-release operation. Before executing the store-with-release operation, GPU 20 may perform one or more writes, resulting in an updated value of cache line 80, which has not been propagated to memory address 82 of system memory 14. After performing the writes to cache line 80, GPU 20 executes the store-with-release operation, which may cause GPU 20 to flush the value of shared variable data 28, stored in cache line 80, to address 82 of system memory 14. Flushing, in some examples, the store-with-release operation may also cause GPU 20 or another processor to invalidate one or more cache lines storing stale values of shared variable data 28, e.g., in cache 18 of CPU 16 or cache 26 of DSP 24. This memory state is illustrated in FIG. 5A.

The store-with-release operation further ensures that the write to shared variable data 28 is not reordered to execute after the execution of a load-with-acquire operation. The store-with release instruction may ensures this execution ordering by tagging one or more subsequent instructions in the instruction stream with a special bit such that the subsequent instruction does not issue until after the store-with-release operation finishes execution.

The store-with-release instruction also ensures that any writes that occur before the store-with-release instruction in a program code sequence finish before the store-with-release instruction executes. To ensure that any previous writes finish before the store-with-release instruction, a processor, such as GPU 12 may execute a microsequence of instructions that flush all, or a portion of the cache of GPU 12. GPU 12 writes the stored value of the store-with-release instruction only upon completion of the microsequence cache flush.

Figure 5B:
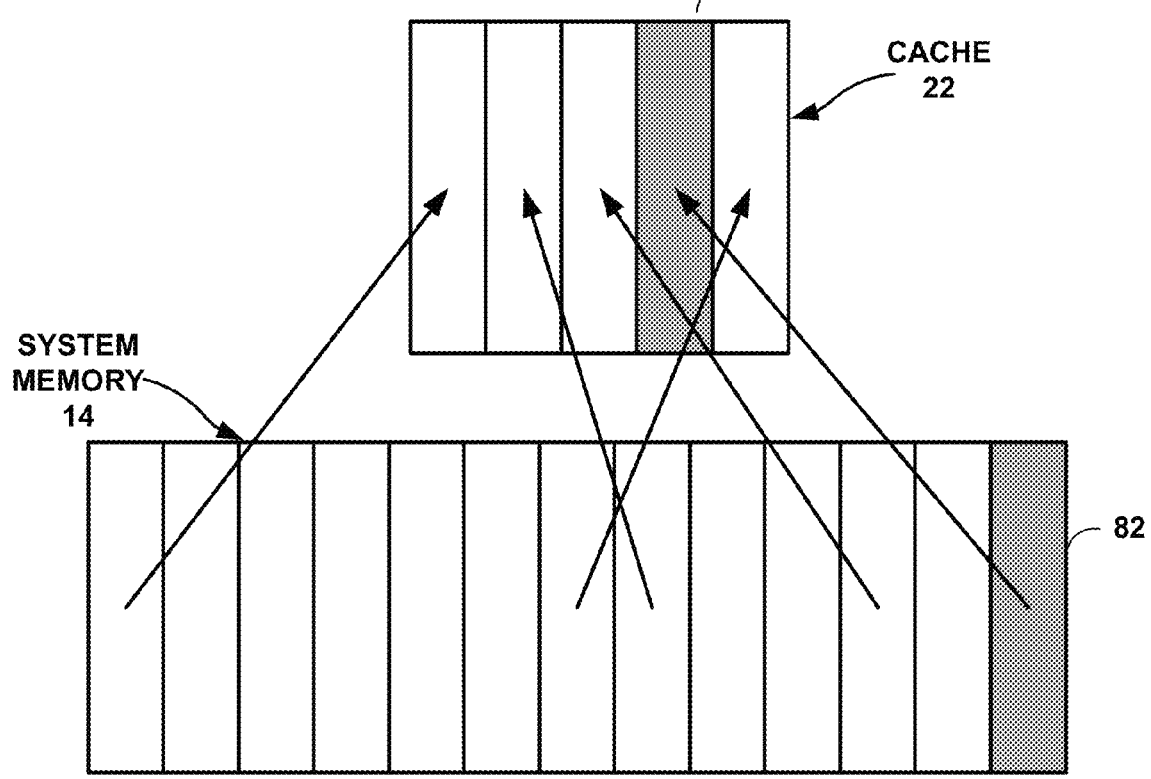
FIG. 5B is a conceptual diagram illustrating the state of system memory after performing a cache flush.

FIG. 5B is a conceptual diagram illustrating the state of system memory after performing a cache flush. In FIG. 5B, GPU 20 has written back the value of shared variable data 28 stored in cache line 80 of cache 22 to location 82 of system memory 14. GPU 20 may have written the value of shared variable data 28 as part of a store-with-release operation, which in some cases, may cause GPU 20 to perform a cache flush on cache lines, e.g., cache line 80, corresponding to a value of shared variable data 28. Although the cache flush is illustrated in FIG. 5B as flushing only the value of location 80 back to system memory location 82, the flush may flush all or multiple values of cache 80 back to system memory 14.

Figure 6:
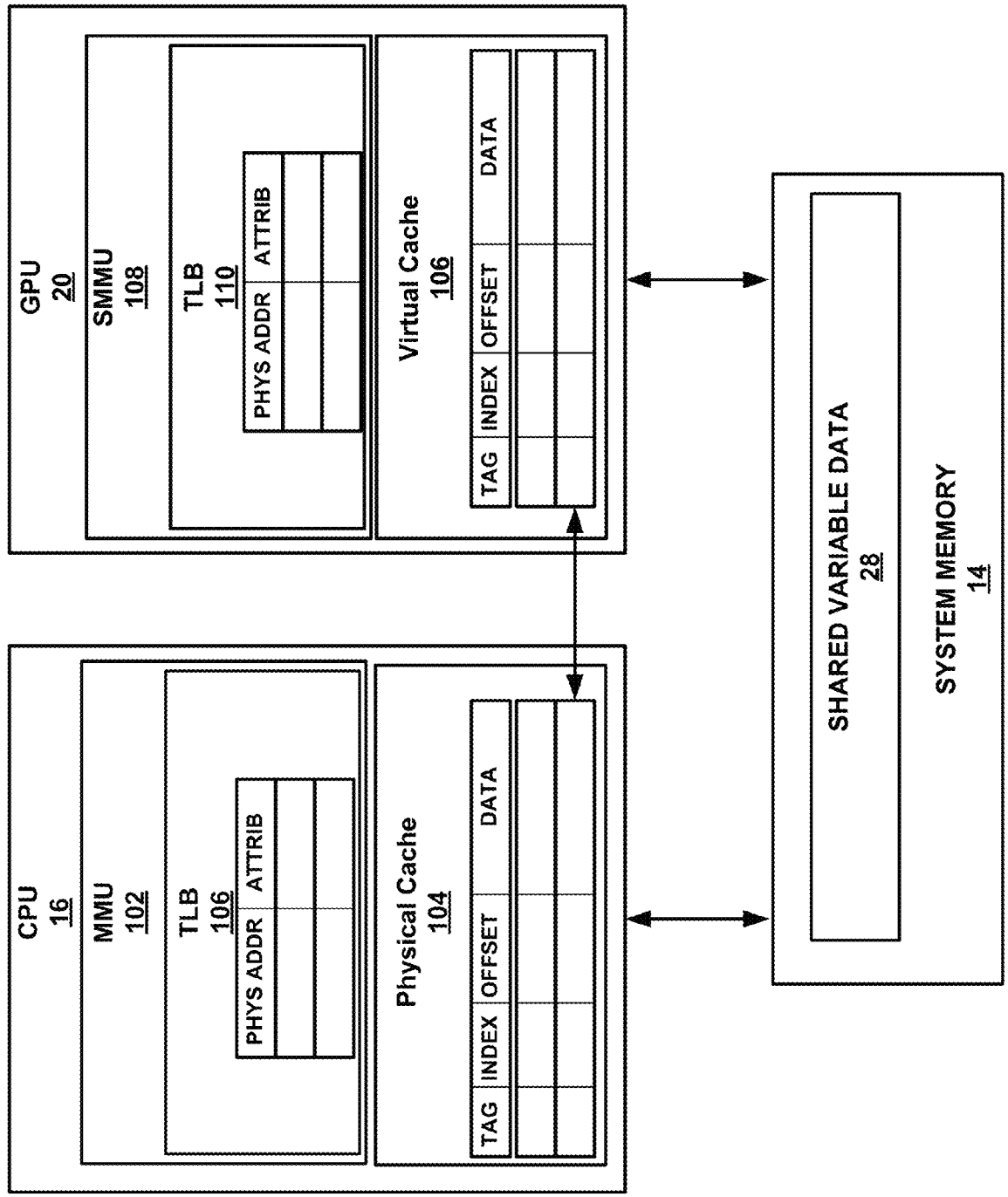
FIG. 6 is a conceptual diagram illustrating cache and memory management units of a GPU and a CPU in accordance with the techniques of this disclosure.

FIG. 6 is a conceptual diagram illustrating caches and memory management units of a GPU and a CPU in accordance with the techniques of this disclosure. FIG. 6 illustrates CPU 16, which further includes memory management unit (MMU) 102, and physical cache 104. FIG. 6 also illustrates GPU 20, which includes virtual cache 106, and system memory management unit (SMMU) 108. CPU 16 and GPU 20 are coupled to system memory 14, which may include shared variable data 28. Although GPU 20 is illustrated as having a virtual cache, and CPU 16 is illustrated as having a physical cache, any combination of virtual and/or physical caches may be possible.

Physical cache 104 may comprise one or more of an L1, L2, or L3 cache in various examples. Physical cache 104 may also comprise an I/O coherent cache which implements the MESI or MOESI cache coherence protocols. For the purposes of example, physical cache 104 includes a plurality of cache lines. Each of the cache lines of physical cache 104 are indexed based on a portion of a physical address, referred to as an index (usually a number of the least significant bits of the virtual address). A cache entry also includes a "tag," which comprises the most significant bits of the address associated with the data stored in the cache. In the case of a physical cache, such as physical cache 104, the tag comprises the most significant bits of the physical address associated with the cached data. To determine whether a particular address is cached, MMU 102 translates a virtual address from a page table, which may be stored in a translation lookaside buffer (TLB), and compares the most significant bits of the translated physical address against the tag of the physical cache to determine whether the two match. If the two match, the data associated with the address is stored in the cache, referred to as a cache "hit." Otherwise, the data is not stored in the cache, referred to as a cache "miss."

Each cache line may also include an offset. Because the size of a page table entry and a cache table entry may be greater (e.g., kilobytes or megabytes) than the word size (i.e. the maximum addressable word of a processor), CPU 16 may index into a particular word of the cache line data based on the value of the offset that specifies the particular word within the cache entry.

Each cache line of physical cache 104 and/or virtual cache 106 may include state, e.g. one or more state bits, associated with individual cache lines of virtual cache 106. The state may indicate whether a particular cache line of virtual cache 106 is dirty, valid, or invalid. Additionally, the state may apply to individual bytes of a cache line. The state that physical cache 104 and/or virtual cache 106 maintain is described in further detail below with respect to FIG. 7.

FIG. 6 also illustrates GPU 20, which further includes virtual cache 106 and SMMU 108. Virtual cache 106 may tag cached data based on a virtual address rather than physical addresses, unlike physical cache 104. Whereas physical cache 104 may translate a virtual address to a physical address, and store a number of most significant bits as a tag of a cache line, virtual cache 106 may store a number of bits of the virtual address as a cache line tag. Such a cache may be referred to as "virtually tagged." By utilizing a virtually tagged cache, SMMU 108 does not need to translate from a virtual address to a physical address when accessing virtual cache 106, and instead translates the virtual address tag to a physical address after accessing the cache. By contrast, MMU 102 translates from a physical address to a virtual address to access physical cache 104.

Each chunk or page of memory is accessible by an address, referred to as a "physical address." However, applications may expect a contiguous address space, whereas available physical address ranges may be non-contiguous. To provide a contiguous memory address space for each application, CPU 16 and GPU 20 may implement virtual addressing. In virtual addressing, applications are allocated virtual address spaces, which map to physical addresses. The mappings between a virtual address and a physical address, are stored in page table entries. The page table entries may be stored in one or more page tables. In various examples, CPU 16 and GPU 20 may each have a separate page tables or a single, common page table.

Each page table entry includes a number of most significant bits of the physical address associated with the specified virtual address, and a number of bits comprising attribute data. Based on the physical address, MMU 102 and SMMU may access the data associated with the physical address, which may be stored at a particular address of system memory 14, or on another storage device, such as a hard disk drive, or solid state drive.

The process of translating between a virtual address and a physical address may incur undesirable amounts of latency. To reduce the latency associated with virtual-to-physical address translation, MMU 102 and SMMU 108 may include a translation lookaside buffer (TLB), such as TLB 106 and TLB 110, respectively. TLB 106 and TLB 110 each cache frequently used page table entries from associated with one or more frequently accessed physical addresses. Each entry of MMU 102 and SMMU 108 is a page table entry (PTE).

Each of MMU 102, physical cache 104, virtual cache 106, and SMMU 108 may also write to, and read from, a page table that is stored in system memory 14. For example, if a particular page table entry is evicted from the TLB of MMU 102 or SMMU 108, the MMU may write the evicted PTE to system memory 14. If a TLB does not include the value of a requested PTE (referred to as a TLB miss), MMU 102 or SMMU 108 may retrieve the requested PTE from system memory 14.

In some examples, MMU 102 and SMMU 108 may also handle cache fills and evictions. In some examples, MMU 102 or SMMU 108 may perform a cache fill by retrieving a value not currently in physical cache 104 from system memory 14 and storing the value in a line of physical cache 104 or virtual cache 106. If a cache line is evicted, i.e. there is no room for the cache entry, MMU 102 or SMMU 108 may write the evicted cache line of physical cache 104 or virtual cache 106 to system memory 14.

MMU 102 and SMMU 108 may also perform "snooping" operations. During a snoop, an MMU, such as SMMU 108 may examine cache lines of another processor, e.g. physical cache 104 of CPU 16. In some cases, SMMU 108 may update the values of one or more cache lines of physical cache 104. For instance, GPU 20 may update a value of shared variable data 28 stored in virtual cache 106 by executing a store-with-release operation. During the store-with-release operation, SMMU 108 may snoop physical cache 104 and update the corresponding cache line of physical cache 104. If CPU 16 attempts to access the value of shared variable data 28, the most current value of shared variable data 28 is already stored in physical cache 104. Accordingly, CPU 16 may detect that physical cache 104 has the most current value, and simply reads the cached value stored in physical cache 104, e.g. when CPU 16 executes a load-with-acquire operation.

In this example, CPU 16 does not invalidate cache lines associated with the value of shared variable data 28 nor does CPU 16 fetch a new value of shared variable data 28 from system memory 14. In this manner, snooping techniques in accordance with this disclosure may improve the performance of a multiprocessor system when writing to shared variable data.

In some examples, GPU 20 may implement a physical cache that supports on-demand coherence, rather than virtual cache 106. If GPU 20 implements a physical cache, such as a cache similar to physical cache 104, GPU 20 tags entries cache lines in the physical cache based on their associated physical addresses, rather than virtual addresses. In the example where GPU 20 includes a physical cache, TLB 110 translates a virtual address to a physical address before writing to the physical cache.

Figure 7:
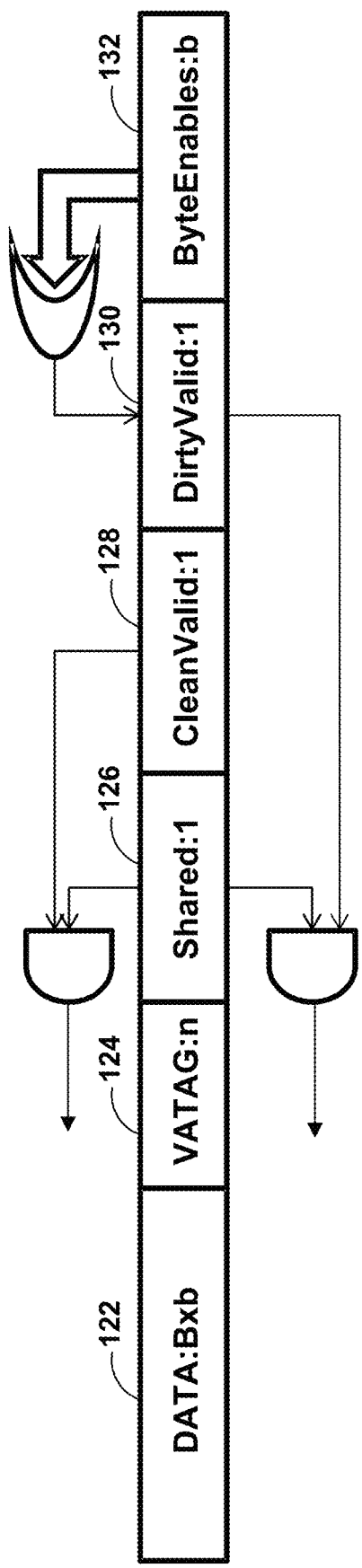
FIG. 7 is a conceptual diagram illustrating a cache line that implements attribute bits in accordance with the techniques of this disclosure.

FIG. 7 is a conceptual diagram illustrating a cache line that implements attribute bits in accordance with the techniques of this disclosure. As described above, virtual cache 106 includes a plurality of cache lines. FIG. 7 illustrates a single cache line 120, which includes a data portion 122, a virtual address tag 124, and may include: an optional shareable bit 126, CleanValid bit 128, DirtyValid bit 130, and ByteEnables bits 132.

Shared bit 126 is an optional bit, which may or may not be included in a cache line. The value of Shared bit 126 indicates whether any bytes of data are shared in that particular cache line, and are therefore visible to other processors, e.g. CPU 16, and/or DSP 24. If a cache line is visible to other processors, changes to the value of shared bytes of data may need to be flushed to system memory 14 because other processors must have current value of shared cache lines. Unshared values do not need to be flushed to system memory 14. In various examples, an operating system (OS) may set a default value of the shared bit, or a user or program may make an API (Application Programming Interface) call to set the default value of Shared bit 126. Subsequent reads by a processor may change the value of Shared bit 126, in some examples. During a cache miss, when a cache line needs to be brought into virtual cache 106, the value of Shared bit 126 may be set to the shared state by default, and subsequent cache accesses (i.e. cache hits) to the same cache line may not change the state of Shared bit 126.

ByteEnables bits 132 include a bit for each byte of cache data 122. Each bit of ByteEnables bits 132 indicates whether that particular cache byte is dirty, and may need to be written out to another cache or to system memory 14. DirtyValid bit 130 is equal to the logical OR of each of ByteEnables bits 132. If DirtyValid bit 130 is equal to one, and Shared bit 126 is equal to one, then SMMU 108 may write out the values of any dirty bytes to system memory 14 during a cache flush operation.

CleanValid bit 128 indicates whether there are any non-dirty data bytes in a cache line. If Shared bit 126 indicates that a cache line is shared, and CleanValid bit 128 is equal to one, then SMMU 108 invalidates the cache line, e.g. cache line 120 when performing a cache invalidation operation, because there may be at least one byte of data 122 that is not current.

Figure 8:
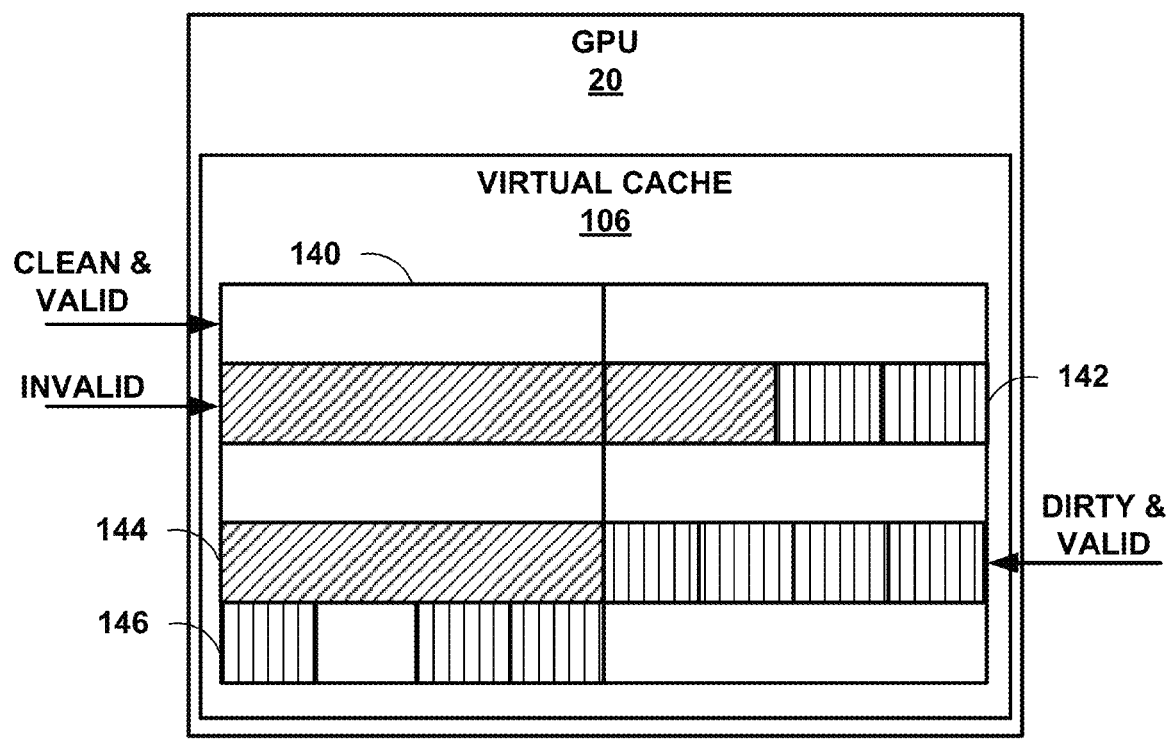
FIG. 8 is a conceptual diagram illustrating a GPU cache in accordance with the techniques of this disclosure.

FIG. 8 is a conceptual diagram illustrating a GPU cache in accordance with the techniques of this disclosure. In the example of FIG. 8, GPU 20 includes virtual cache 106. Virtual cache 106 includes a plurality of cache lines. Each of the lines are associated with attributes, such as Shared bit 126, CleanValid bit 128, DirtyValid bit 130, and ByteEnables bits 132, as described in the example of FIG. 7. The states of each cache line may be a mixture of: "clean," "valid," "invalid," and "dirty." The techniques of this disclosure may enable a memory management unit (MMU) of a processor, such as SMMU 108 of GPU 20 to maintain the state bits for each line of a cache that indicate the state of each line of virtual cache 106.

SMMU 108 may mark a cache line as dirty if the cache line includes one or more updated values that have not been written to system memory 14 or another memory. SMMU 108 may mark a cache line as valid if the contents of the cache line are up-to-date, i.e. no other processor has written a newer value to the physical address associated with that cache entry. By contrast, SMMU 108 may mark a cache line as invalid if the cache line does not contain the most up-to-date copy of a particular memory address. When SMMU 108 attempts to access an invalid line, SMMU 108 must retrieve a new copy of the shared data from another cache, or from main memory.

In the example of FIG. 8, cache lines without any hashing, such as cache line 140, represent clean and valid cache lines. Cache lines with diagonal hashing, such as cache line 144, represent invalid cache lines, and cache lines with vertical hashing represent dirty cache lines. Cache lines may also be divided into blocks or regions, e.g. byte-sized regions that have the different cache states. As an example, cache line 142 includes cache blocks that are both invalid and dirty, and cache line 146 includes blocks that are both dirty and clean (as well as valid). By definition, any block that is clean or dirty is also valid. However, other blocks within the same cache line may be invalid. By maintaining the state of each block stored in virtual cache 106 in accordance with the techniques of this disclosure, it may be possible to reduce unnecessary cache flushes or invalidations when performing a cache eviction or a cache fill.

As described above, if the cache line containing shared variable data 28 does not have the most up-to-date value of a shared value, such as shared variable data 28, GPU 20 may retrieve the up-to-date value as part of executing a load-with-acquire operation. In various examples, retrieving the up-to-date shared variable value may comprise SMMU 108 filling a cache line or a portion of a cache line with the up-to-date value, e.g. from system memory 14 (referred to as a "cache fill").

Filling an entire cache line when performing a cache fill may be undesirable in some examples. Accordingly, the techniques of this disclosure mark the cache states of individual blocks of a cache line, as described above. Based on the state of each block, SMMU 108 may only invalidate and update, or flush blocks that do not contain an up-to-date values of shared variable data 28. As an example, if a cache line, such as cache line 144 includes both dirty and invalid blocks, SMMU 108 may only retrieve cache data corresponding to the invalid blocks when performing a cache fill. Blocks marked as dirty are not updated when performing a cache fill because dirty blocks include the most up-to-date values of shared variable data. Filling only non-dirty blocks may reduce the bandwidth consumed and/or the latency associated with performing a cache fill.

As described above, GPU 20 may perform a cache flush operation when executing a store-with-release operation. The cache flush may write values of shared variable data 28 out to system memory 14. In one technique, MMU 108 may write an entire cache line to system memory 14 during a cache flush. However, writing out an entire cache line, rather than individual blocks, may be unnecessary in some cases. For example, a cache line may include dirty blocks and invalid blocks (e.g., cache line 142), or dirty blocks and valid blocks (e.g., cache line 146). During a cache flush, only the dirty blocks, which by definition have the most current and up-to-date values of shared data, need to be written to system memory 14. Accordingly, SMMU 108 may only write out dirty blocks to system memory 14 when performing a cache flush operation.

In the case of a cache line of virtual cache 106 that includes both dirty and invalid blocks, SMMU 108 may write the dirty blocks to system memory 14, and upon completion of the write, may mark each of the dirty blocks of virtual cache 106 as invalid. In the case that a cache line of virtual cache 106, such as cache line 146, includes both dirty and valid blocks, SMMU 108 may write the dirty blocks to system memory 14, and upon completion of the write, may mark the dirty blocks as valid. In this manner, the data, bandwidth and/or latency associated with SMMU 108 performing a cache fill may be reduced compared to writing out an entire cache line, in some cases.

The SMMU 108 may also perform a line eviction in some cases, in which SMMU 108 replaces a cache line are being replaced, e.g. due to cache pressure. As part of the cache eviction process, SMMU 108 writes the line to be evicted out to system memory 14. In a line eviction, SMMU 108 may first write out any bytes or words marked as dirty to system memory 14. SMMU 108 may then invalidate the entire cache line to be evicted. By having SMMU 108 writing out only blocks marked as dirty, the techniques of this disclosure may reduce the data, bandwidth, and/or time associated with performing a cache eviction.

Figure 9:
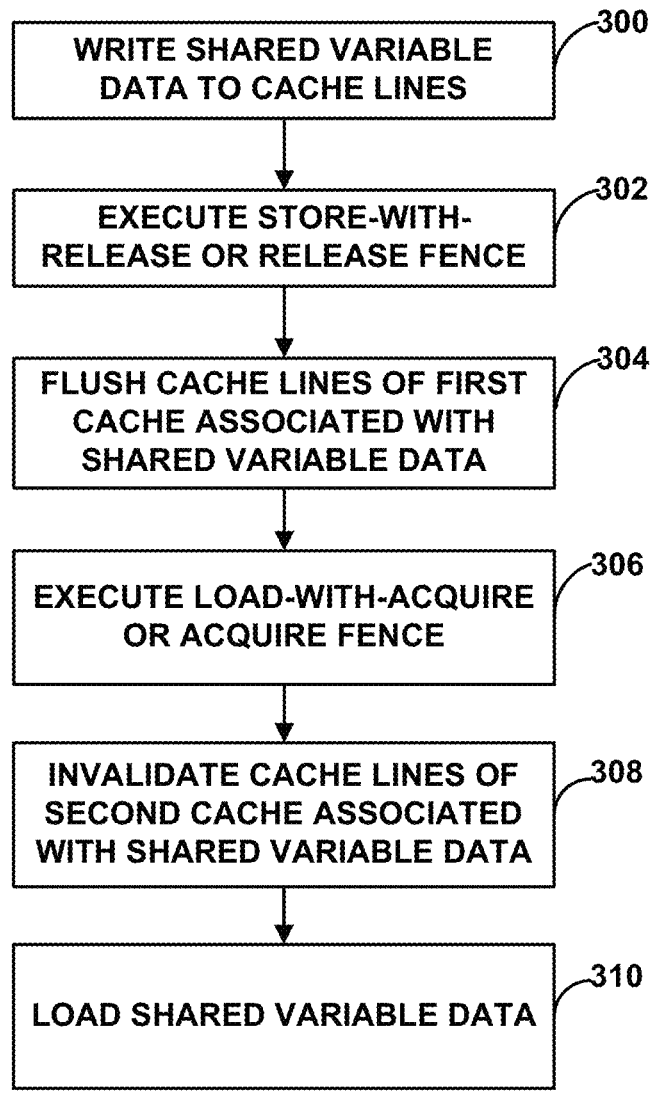
FIG. 9 is a flowchart illustrating a process for maintaining cache coherency in a multi-core system in accordance with one or more examples described in this disclosure.

FIG. 9 is a flowchart illustrating a process for maintaining cache coherency in a multi-core system in accordance with one or more examples described in this disclosure. For purposes of illustration only, reference is made to GPU 20 of FIG. 1, however any processor of multi-core system 2 may perform the techniques of this disclosure.

In FIG. 9, a first processor, e.g. GPU 20, may be configured to write shared variable data 28 to cache lines of a first cache of a first processor (300). GPU 20 may then execute a store-with-release operation or release a fence (302). In some examples, executing the store-with-release operation may cause GPU 20 to flush cache lines of cache 22 of GPU 20 associated with shared variable data 28. The method may further include a second processor, e.g. CPU 16, executing a load-with-acquire operation or acquiring a fence (306). In some examples, executing the load-with-acquire operation may cause CPU 16 to invalidate cache lines of cache 18 associated with shared variable data 28 (308). CPU 16 may then read load shared the value of shared variable data 28 from cache 18 (310).

In some examples, executing the store-with-release operation further may further include flushing, with the first programmable processor, cache lines of the first cache associated with to the shared variable data, and waiting, with the first programmable processor, for any previous stores to complete.

In an example, executing the load-with-acquire operation further comprises invalidating, with a second programmable processor, cache lines of the second programmable processor associated with the shared variable data, filling, with the second programmable processor, cache lines of the second cache associated with to the shared variable data, and preventing, with the second programmable processor, subsequent instructions from issuing until the load-with-acquire operation finishes executing.

In some examples, the method of FIG. 9 further comprises snooping, with the second processor, the cache of the first programmable processor, detecting, with the second programmable processor, a cache hit associated with an updated value of the shared variable data, and writing, with the second programmable processor, the updated value of the shared variable data to the cache of the second programmable processor responsive to detecting the cache hit associated with the shared variable data.

In some examples, executing the store-with-release operation further comprises writing the shared variable data to one of a higher level cache having a higher level than the first cache, a system memory, and the second cache of the second processor.

In another example, the first processor may comprise a central processing unit, e.g., CPU 16, and the second processor comprises a graphical processing unit (GPU), e.g., GPU 20. To invalidate the cache lines of the second cache, GPU 20 may insert, with a compiler, an invalidation instruction into shader code operable by the GPU.

In another example, all of the cache lines of the first processor and all of the cache lines of the second processor are shared. Executing the store-with-release operation may further all of the cache lines of the first processor. Executing the load-with-acquire operation comprises invalidating all of the cache second of the first processor.

In some instances, at least one shared line of the shared subset of the cache lines of the first processor is indicated by a first shareability attribute, and each shared line of the shared subset of the cache lines of the second processor is indicated by a second shareability attribute.

In another instance, the method of FIG. 9 further comprises performing a cache fill operation, and responsive to performing the cache fill operation, reading one of the first shareability attribute or the second shareability attribute from a page table.

In yet another instance, the method of FIG. 9 further comprises issuing, by a compiler, at least one load instruction or store instruction, wherein the at least one load instruction or store instruction indicates at least one of the first shareability attribute or the second shareability attribute.

In another example, the load instruction comprises a shared load instruction, and the store instruction comprises a shared store instruction.

In yet another example, the method further comprises reading one or more bits of a plurality of address pointers that indicate at least one of the first shareability attribute and the second shareability attribute.

In yet another example, at least one of the first shareability attribute and the second shareability attribute indicates that at least one of the first cache and the second cache is in an unshared state, and the method further comprises performing a cache operation on at least one of the first cache and the second cache, and responsive to performing the cache operation, changing the at least one of the first shareability attribute and the second shareability attribute to indicate that at least one of the first cache and the second cache is in a shared state.

In yet another example, at least one of the first shareability attribute and the second shareability attribute indicates that, at least one of the first cache and the second cache is in a shared state, and the method further comprises performing a cache operation on at least one of the first cache and the second cache, and responsive to performing the cache operation, changing the at least one of the first shareability attribute and the second shareability attribute to indicate that at least one of the first cache and the second cache is in an unshared shared state.

In yet another example, the method further comprises comparing an address stored one or more register with an address of at least one of the first cache and the second cache to determine an address region of the at least one of the first cache and the second cache, and determining whether the address region is shared or unshared.

In yet another example, the method further comprises determining dirty bytes of at least one of the first cache and the second cache, performing at least one of a cache eviction and a cache flush, and writing to a cache or system memory only the dirty bytes during the at least one of the cache eviction and the cache flush.

In yet another example, to execute the store-with-release operation, the first processor flushes the cache of the first processor responsive to at least one of receiving an interrupt, a register read, a register write, and a programmable delay.

In yet another example, to execute the store-with-release operation, the first processor flushes the first cache responsive to at least one of cache pressure, a timeout, and an explicit software cache maintenance.

In yet another example, to execute the store-with-release operation, the first processor flushes the first cache responsive to at least one of cache pressure, a timeout, and an explicit software cache maintenance.

In yet another example, at least one of the first cache and the second cache are virtually tagged. In some examples, executing the store-with-release operation comprises translating a virtual address stored in the first cache to a physical address, and flushing the cache lines of the first cache after translating the virtual address to the physical address based on the physical address.

In yet another example, executing the load-with-acquire operation comprises translating a virtual address stored in the second cache to a physical address, and invalidating the cache lines of the second cache after translating the virtual address to the physical address based on the physical address.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored as one or more instructions or code on a computer-readable medium. Computer-readable media may include computer data storage media. Data storage media may be any available media that can be accessed by one or more computers or one or more processors to retrieve instructions, code and/or data structures for implementation of the techniques described in this disclosure. By way of example, and not limitation, such computer-readable media can comprise random access memory (RAM), read-only memory (ROM), EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of implementing on-demand cache coherency, e.g., with a release consistency memory ordering model, in accordance with this disclosure are described above. An Appendix also accompanies this disclosure. The techniques described in the Appendix may be implemented on one or more of the units illustrated in FIG. 1, e.g., CPU 16, GPU 20, and/or DSP 24. The accompanying Appendix is incorporated by reference in its entirety in this disclosure, and may be considered as an attachment to this disclosure.

The techniques of this disclosure may be implemented in a wide variety of devices or apparatuses, including a wireless handset, an integrated circuit (IC) or a set of ICs (i.e., a chip set). Various components, modules or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:
    determining whether instructions for execution by a programmable graphics processor include a memory operation to shared variable data accessible by the programmable graphics processor and a programmable processor;
    modifying the instructions to include a first synchronization operation and a second synchronization operation after the memory operation, wherein the first and second synchronization operations each comprise a memory coherency operation, wherein the first synchronization operation is a store-with-release operation and the second synchronization operation is a load-with-acquire operation;
    executing the memory operation;
    executing the first synchronization operation; and
    executing the second synchronization operation.

2. The method of claim 1, wherein executing the first synchronization operation further comprises:

flushing, with the programmable graphics processor, cache lines associated with the shared variable data; and
waiting for any previous stores to complete.

3. The method of claim 1, wherein executing the second synchronization operation further comprises:
   invalidating, with the programmable graphics processor, cache lines associated with the shared variable data;
   filling, with the programmable graphics processor, the cache lines associated with the shared variable data; and
   preventing, with the programmable graphics processor, subsequent instructions from issuing until the second synchronization operation finishes executing.

4. The method of claim 3, further comprising:
   snooping, with the programmable graphics processor, a cache of the programmable processor;
   detecting, with the programmable graphics processor, a cache hit associated with an updated value of the shared variable data; and
   writing, with the programmable graphics processor, the updated value of the shared variable data to a cache of the programmable graphics processor responsive to detecting the cache hit associated with the shared variable data.

5. The method of claim 1, wherein executing the first synchronization operation further comprises:
   writing the shared variable data to one of a higher level cache having a higher level than a first cache of the programmable graphics processor, a system memory, a cache of the programmable processor, and the first cache of the programmable graphics processor.

6. The method of claim 1, wherein the programmable processor comprises a central processing unit (CPU).

7. The method of claim 1, wherein all cache lines of the programmable processor and all cache lines of the programmable graphics processor are shared,
   wherein executing the first synchronization operation further comprises flushing all of the cache lines of the programmable processor, and
   wherein executing the second synchronization operation further comprises invalidating all of the cache lines of the programmable graphics processor.

8. The method of claim 1, wherein a subset of all cache lines of the programmable processor are shared, and a subset of all cache lines of the programmable graphics processor are shared,
   wherein executing the first synchronization operation further comprises flushing only the shared subset of the cache lines of the programmable processor, and
   wherein executing the second synchronization operation further comprises invalidating only the shared subset of the cache lines of the programmable graphics processor.

9. The method of claim 8, wherein at least one shared line of the shared subset of the cache lines of the programmable processor is indicated by a first shareability attribute, and
   wherein each shared line of the shared subset of the cache lines of the programmable graphics processor is indicated by a second shareability attribute.

10. The method of claim 9, further comprising:
    performing a cache fill operation; and
    responsive to performing the cache fill operation, reading at least one of the first shareability attribute and the second shareability attribute from a page table.

11. The method of claim 9, further comprising:
    issuing, by a compiler, at least one of a load instruction and a store instruction, wherein the at least one of the load instruction and the store instruction indicates the at least one of the first shareability attribute and the second shareability attribute.

12. The method of claim 11, wherein the load instruction comprises a shared load instruction, and wherein the store instruction comprises a shared store instruction.

13. The method of claim 9, further comprising reading one or more bits of a plurality of address pointers that indicate at least one of the first shareability attribute and the second shareability attribute.

14. The method of claim 9, wherein at least one of the first shareability attribute and the second shareability attribute indicates that at least one of a cache associated with the programmable processor and a cache associated with the programmable graphics processor is in an unshared state, the method further comprising:
    performing a cache operation on at least one of the cache associated with the programmable processor and the cache associated with the programmable graphics processor; and
    responsive to performing the cache operation, changing the at least one of the first shareability attribute and the second shareability attribute to indicate that at least one of the cache associated with the programmable processor and the cache associated with the programmable graphics processor is in a shared state.

15. The method of claim 9, wherein at least one of the first shareability attribute and the second shareability attribute indicates that at least one of a cache associated with the programmable processor and a cache associated with the programmable graphics processor is in a shared state, the method further comprising:
    performing a cache operation on at least one of the cache associated with the programmable processor and the cache associated with the programmable graphics processor; and
    responsive to performing the cache operation, changing the at least one of the first shareability attribute and the second shareability attribute to indicate that at least one of the cache associated with the programmable processor and the cache associated with the programmable graphics processor is in an unshared shared state.

16. The method of claim 1, further comprising:
    comparing an address stored one or more register with an address of at least one of a cache associated with the programmable processor and a cache associated with the programmable graphics processor to determine an address region of the at least one of the cache associated with the programmable processor and the cache associated with the programmable graphics processor; and
    determining whether the address region is shared or unshared.

17. The method of claim 1, further comprising:
    determining dirty bytes of at least one of a cache associated with the programmable processor and a cache associated with the programmable graphics processor;
    performing at least one of a cache eviction and a cache flush; and
    writing to a cache or system memory only the dirty bytes during the at least one of the cache eviction and the cache flush.

18. The method of claim 1, wherein executing the first synchronization operation further comprises:
    flushing a cache responsive to at least one of:
    receiving an interrupt, a register read, a register write, and a programmable delay.

19. The method of claim 1, wherein executing the first synchronization operation further comprises:
flushing a cache responsive to at least one of:
cache pressure, a timeout, and an explicit software cache maintenance.

20. The method of claim 1, wherein at least one of a cache associated with the programmable processor and a cache associated with the programmable graphics processor are virtually tagged.

21. The method of claim 1, wherein executing the first synchronization operation further comprises translating a virtual address stored in a cache to a physical address; and
flushing cache lines of the cache after translating the virtual address to the physical address based on the physical address.

22. The method of claim 1, wherein executing the second synchronization operation further comprises translating a virtual address stored in a cache to a physical address; and
invalidating cache lines of the cache after translating the virtual address to the physical address based on the physical address.

23. An apparatus comprising:
hardware means for determining whether instructions for execution by a programmable graphics processor include a memory operation to shared variable data accessible by the programmable graphics processor and a programmable processor;
hardware means for modifying the instructions to include a first synchronization operation and a second synchronization operation after the memory operation, wherein the first and second synchronization operations each comprise a memory coherency operation, wherein the first synchronization operation is a store-with-release operation and the second synchronization operation is a load-with-acquire operation;
hardware means for executing the memory operation;
hardware means for executing the first synchronization operation; and
hardware means for executing the second synchronization operation.

24. The apparatus of claim 23, wherein the means for executing the first synchronization operation further comprises:
means for flushing cache lines associated with the shared variable data; and
means for waiting for any previous stores to complete.

25. The apparatus of claim 23, wherein the means for executing the second synchronization operation further comprises:
means for invalidating cache lines associated with the shared variable data;
means for filling the cache lines associated with the shared variable data; and
means for preventing subsequent instructions from issuing until the second synchronization operation finishes executing.

26. The apparatus of claim 25, further comprising:
means for snooping, a cache of the programmable processor;
means for detecting a cache hit associated with an updated value of the shared variable data; and
means for writing the updated value of the shared variable data to a cache of the programmable graphics processor responsive to detecting the cache hit associated with the shared variable data.

27. An apparatus comprising:
a programmable processor;
a programmable graphics processor, wherein the apparatus is configured to:
determine whether instructions for execution by the programmable graphics processor include a memory operation to shared variable data accessible by the programmable graphics processor and the programmable processor;
modify the instructions to include a first synchronization operation and a second synchronization operation after the memory operation, wherein the first and second synchronization operations each comprise a memory coherency operation, wherein the first synchronization operation is a store-with-release operation and the second synchronization operation is a load-with-acquire operation;
execute the memory operation;
execute the first synchronization operation; and
execute the second synchronization operation.

28. The apparatus of claim 27, wherein to execute the first synchronization operation, the apparatus is further configured to:
flush, with the programmable graphics processor, cache lines associated with the shared variable data; and
wait for any previous stores to complete.

29. The apparatus of claim 27, wherein to execute the second synchronization operation, the apparatus is further configured to:
invalidate, with the programmable graphics processor, cache lines associated with the shared variable data;
fill, with the programmable graphics processor, the cache lines associated with the shared variable data; and
prevent, with the programmable graphics processor, subsequent instructions from issuing until the second synchronization operation finishes executing.

30. The apparatus of claim 29, wherein the apparatus is further configured to:
snoop, with the programmable graphics processor, a cache of the programmable processor;
detect, with the programmable graphics processor, a cache hit associated with an updated value of the shared variable data; and
write, with the programmable graphics processor, the updated value of the shared variable data to a cache of the programmable graphics processor responsive to detecting the cache hit associated with the shared variable data.

31. The apparatus of claim 27, wherein to execute the first synchronization operation, the apparatus is further configured to:
write the shared variable data to one of a higher level cache having a higher level than a first cache of the programmable graphics processor, a system memory, a cache of the programmable processor, and the first cache of the programmable graphics processor.

32. The apparatus of claim 27, wherein the programmable processor comprises a central processing unit (CPU).

33. The apparatus of claim 27, wherein all cache lines of the programmable processor and all cache lines of the programmable graphics processor are shared,
wherein to execute the first synchronization operation, the apparatus is further configured to flush all of the cache lines of the programmable processor, and
wherein to execute the second synchronization operation, the apparatus is further configured to invalidate all of the cache lines of the programmable graphics processor.

34. The apparatus of claim 27, wherein a subset of all cache lines of the programmable processor are shared, and a subset of all cache lines of the programmable graphics processor are shared,
  wherein to execute the first synchronization operation, the apparatus is further configured to flush only the shared subset of the cache lines of the programmable processor, and
  wherein to execute the second synchronization operation, the apparatus is further configured to invalidate only the shared subset of the cache lines of the programmable graphics processor.

35. The apparatus of claim 34, wherein at least one shared line of the shared subset of the cache lines of the programmable processor is indicated by a first shareability attribute, and
  wherein each shared line of the shared subset of the cache lines of the programmable graphics processor is indicated by a second shareability attribute.

36. The apparatus of claim 35, wherein the apparatus is further configured to:
  perform a cache fill operation; and
  responsive to performing the cache fill operation, read at least one of the first shareability attribute and the second shareability attribute from a page table.

37. The apparatus of claim 35, wherein the apparatus is further configured to:
  issue, by a compiler, at least one of a load instruction and a store instruction, wherein the at least one of the load instruction and the store instruction indicates the at least one of the first shareability attribute and the second shareability attribute.

38. The apparatus of claim 37, wherein the load instruction comprises a shared load instruction, and wherein the store instruction comprises a shared store instruction.

39. The apparatus of claim 35, wherein the apparatus is further configured to read one or more bits of a plurality of address pointers that indicate at least one of the first shareability attribute and the second shareability attribute.

40. The apparatus of claim 35, wherein at least one of the first shareability attribute and the second shareability attribute indicates that at least one of a cache associated with the programmable processor and a cache associated with the programmable graphics processor is in an unshared state, wherein the apparatus is further configured to:
  perform a cache operation on at least one of the cache associated with the programmable processor and the cache associated with the programmable graphics processor; and
  responsive to performing the cache operation, change the at least one of the first shareability attribute and the second shareability attribute to indicate that at least one of the cache associated with the programmable processor and the cache associated with the programmable graphics processor is in a shared state.

41. The apparatus of claim 35, wherein at least one of the first shareability attribute and the second shareability attribute indicates that at least one of a cache associated with the programmable processor and a cache associated with the programmable graphics processor is in a shared state, wherein the apparatus is further configured to:
  perform a cache operation on at least one of the cache associated with the programmable processor and the cache associated with the programmable graphics processor; and
  responsive to performing the cache operation, change the at least one of the first shareability attribute and the second shareability attribute to indicate that at least one of the cache associated with the programmable processor and the cache associated with the programmable graphics processor is in an unshared shared state.

42. The apparatus of claim 27, wherein the apparatus is further configured to:
  compare an address stored one or more register with an address of at least one of a cache associated with the programmable processor and a cache associated with the programmable graphics processor to determine an address region of the at least one of the cache associated with the programmable processor and the cache associated with the programmable graphics processor; and
  determine whether the address region is shared or unshared.

43. The apparatus of claim 27, wherein the apparatus is further configured to:
  determine dirty bytes of at least one of a cache associated with the programmable processor and a cache associated with the programmable graphics processor;
  perform at least one of a cache eviction and a cache flush; and
  write to a cache or system memory only the dirty bytes during the at least one of the cache eviction and the cache flush.

44. The apparatus of claim 27, wherein to execute first synchronization operation, the apparatus is further configured to:
  flush a cache responsive to at least one of:
  receiving an interrupt, a register read, a register write, and a programmable delay.

45. The apparatus of claim 27, wherein to execute the first synchronization operation, the apparatus is further configured to:
  flush a cache responsive to at least one of:
  cache pressure, a timeout, and an explicit software cache maintenance.

46. The apparatus of claim 27, wherein at least one of a cache associated with the programmable processor and a cache associated with the programmable graphics processor are virtually tagged.

47. The apparatus of claim 27, wherein to execute the first synchronization operation, the apparatus is further configured to:
  translate a virtual address stored in a cache to a physical address; and
  flush cache lines of the cache after translating the virtual address to the physical address based on the physical address.

48. The apparatus of claim 27, wherein to execute the second synchronization operation, the apparatus is further configured to translate a virtual address stored in a cache to a physical address; and
  invalidate cache lines of the cache after translating the virtual address to the physical address based on the physical address.

49. A non-transitory computer readable storage medium having instructions stored thereon that when executed cause one or more processors to:
  determine whether instructions for execution by a programmable graphics processor include a memory operation to shared variable data accessible by the programmable graphics processor and a programmable processor;
  modify the instructions to include a first synchronization operation and a second synchronization operation after the memory operation, wherein the first and second synchronization operations each comprise a memory coherency operation, wherein the first synchronization operation is a store-with-release operation and the second synchronization operation is a load-with-acquire operation;
execute the memory operation;
execute the first synchronization operation; and
execute the second synchronization operation.

50. The non-transitory computer readable storage medium of claim 49, wherein the instructions that cause the one or more processors to execute the first synchronization operation further comprise instructions that, when executed, cause the one or more processors to:
flush, with the programmable graphics processor, cache lines associated with the shared variable data; and
wait for any previous stores to complete.

51. The non-transitory computer-readable storage medium of claim 49, wherein the instructions that cause the one or more processors to execute the second synchronization operation further comprise instructions that, when executed, cause the one or more processors to:
invalidate, with the programmable graphics processor, cache lines associated with the shared variable data;
fill, with the programmable graphics processor, the cache lines associated with the shared variable data; and
prevent, with the programmable graphics processor, subsequent instructions from issuing until the second synchronization operation finishes executing.

52. The non-transitory computer-readable storage medium of claim 49 further comprising instructions that, when executed, cause the one or more processors to:
snoop, with the programmable graphics processor, a cache of the programmable processor;
detect, with the programmable graphics processor, a cache hit associated with an updated value of the shared variable data; and
write, with the programmable graphics processor, the updated value of the shared variable data to a cache of the programmable graphics processor responsive to detecting the cache hit associated with the shared variable data.

* * * * *